(12) United States Patent
Kang et al.

(10) Patent No.: US 10,111,025 B2
(45) Date of Patent: Oct. 23, 2018

(54) SERVICE PROVIDING TERMINAL CONNECTION METHOD AND APPARATUS

(71) Applicant: SAMSUNG ELECTRONICS CO., LTD., Suwon-si (KR)

(72) Inventors: Jae-eun Kang, Suwon-si (KR); Chil-youl Yang, Anyang-si (KR); Myoung-hwan Lee, Suwon-si (KR); Chun-ho Lee, Seongnam-si (KR); Tae-young Lee, Seoul (KR); Chung-suk Han, Ansan-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 34 days.

(21) Appl. No.: 14/140,715

(22) Filed: Dec. 26, 2013

(65) Prior Publication Data
US 2014/0179276 A1    Jun. 26, 2014

(30) Foreign Application Priority Data

Dec. 26, 2012 (KR) .................. 10-2012-0153708
May 2, 2013 (KR) .................. 10-2013-0049622

(51) Int. Cl.
*H04M 1/66* (2006.01)
*H04M 1/68* (2006.01)
(Continued)

(52) U.S. Cl.
CPC ............ *H04W 4/008* (2013.01); *G06F 21/35* (2013.01); *G06F 21/43* (2013.01); *G06F 21/445* (2013.01);
(Continued)

(58) Field of Classification Search
CPC ..... H04W 4/003; H04W 4/005; H04W 4/006; H04W 4/008; H04W 4/08; H04W 4/18;
(Continued)

(56) References Cited

U.S. PATENT DOCUMENTS

2003/0103088 A1* 6/2003 Dresti .................. G06F 3/0481
715/835
2006/0251256 A1   11/2006 Asokan et al.
(Continued)

FOREIGN PATENT DOCUMENTS

WO    2009-125790 A1    10/2009

OTHER PUBLICATIONS

International Search Report for PCT/KR2013/012198 dated Mar. 27, 2014 [PCT/ISA/210].
(Continued)

*Primary Examiner* — Anthony Addy
*Assistant Examiner* — Matthew Genack
(74) *Attorney, Agent, or Firm* — Sughrue Mion, PLLC

(57) ABSTRACT

A method and apparatuses for device control performed by a first device to control services provided by a service providing device is provided. The method includes connecting, through out-of-band communication, to a second device that includes identification information related to the service providing device, receiving, through the out-of-band communication, the identification information related to the service providing device from the second device, executing at least one application related to the identification information, and connecting, through in-band communication, to the service providing device using the identification information, and controlling, from the first device, services provided by the service providing device.

49 Claims, 16 Drawing Sheets

(51) Int. Cl.

| | |
|---|---|
| *H04M 3/16* | (2006.01) |
| *H04W 4/00* | (2018.01) |
| *H04W 12/04* | (2009.01) |
| *G06F 21/35* | (2013.01) |
| *G06F 21/43* | (2013.01) |
| *G06F 21/44* | (2013.01) |
| *H04W 4/80* | (2018.01) |
| *H04W 76/14* | (2018.01) |
| *H04L 29/06* | (2006.01) |
| *H04W 12/02* | (2009.01) |
| *H04W 84/18* | (2009.01) |

(52) U.S. Cl.
CPC ............. *H04W 4/80* (2018.02); *H04W 12/04* (2013.01); *H04W 76/14* (2018.02); *G06F 2221/2115* (2013.01); *G06F 2221/2141* (2013.01); *H04L 63/0492* (2013.01); *H04L 63/18* (2013.01); *H04W 12/02* (2013.01); *H04W 84/18* (2013.01)

(58) Field of Classification Search
CPC ....... H04W 4/185; H04W 4/20; H04W 12/04; H04W 12/06; H04W 12/08; H04W 28/06; H04W 28/18; H04W 72/00; H04W 76/02; H04W 76/023; H04W 84/10; H04W 84/12; H04W 84/18; H04W 12/12; H04W 60/00; H04W 4/14
USPC .................. 455/410–411, 414.1, 435.1, 466
See application file for complete search history.

(56) References Cited

U.S. PATENT DOCUMENTS

| | | |
|---|---|---|
| 2007/0203796 A1 | 8/2007 | Riggs, III |
| 2009/0164786 A1 | 6/2009 | Sekimoto et al. |
| 2010/0216401 A1 | 8/2010 | Kitahara |
| 2011/0019647 A1 | 1/2011 | Fujino |
| 2011/0093136 A1 | 4/2011 | Moinzadeh et al. |
| 2011/0275316 A1 | 11/2011 | Suumäki et al. |
| 2012/0099566 A1* | 4/2012 | Laine et al. ............... 370/338 |
| 2012/0146918 A1* | 6/2012 | Kreiner et al. ............ 345/173 |
| 2012/0156993 A1 | 6/2012 | Seo et al. |
| 2012/0174190 A1 | 7/2012 | Fetterman et al. |
| 2012/0202422 A1 | 8/2012 | Berg et al. |
| 2014/0020081 A1* | 1/2014 | Zhang et al. ................. 726/9 |
| 2014/0035727 A1 | 2/2014 | Due Hal Dong Nguyen |
| 2014/0070919 A1* | 3/2014 | Jackson et al. ............ 340/5.61 |
| 2014/0162549 A1* | 6/2014 | Sanuallah ............ H04W 4/008 455/41.1 |

OTHER PUBLICATIONS

Written Opinion for PCT/KR2013/012198 dated Mar. 27, 2014 [PCT/ISA/237].
Communication from the European Patent Office dated Apr. 3, 2014 in a counterpart European Application No. 13199682.9.
Communication dated Nov. 13, 2017, issued by the Japanese Patent Office in counterpart Japanese Application No. 2013-269296.
Communication dated Jul. 11, 2018 by the European Patent Office in counterpart European Patent Application No. 13199682.9.

* cited by examiner

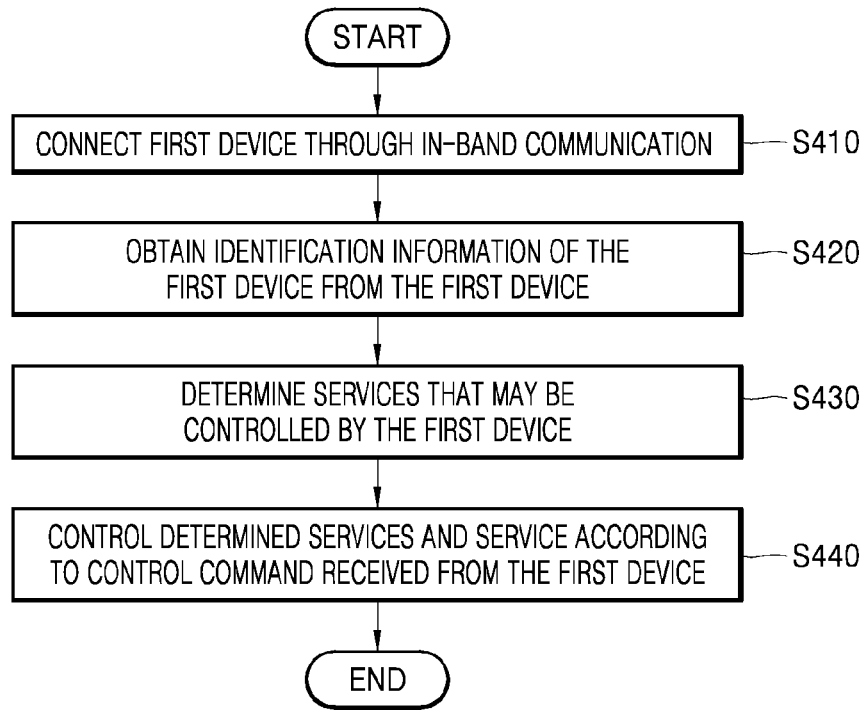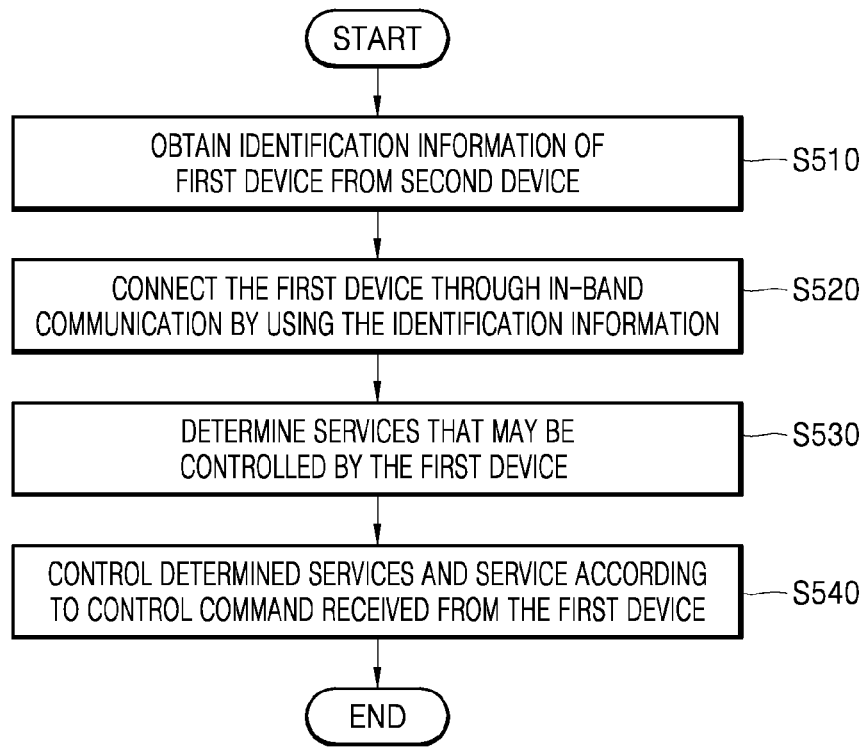

SECOND DEVICE IS CONNECTED TO AND AUTHENTICATED
BY GATEWAY OF HOME NETWORK (S1101)

TRANSMIT CONNECTION INFORMATION OF GATEWAY THROUGH
NFC BETWEEN FIRST DEVICE AND SECOND DEVICE (S1102)

OBTAIN AUTHORIZATION OF AIR CONDITIONER, LIGHTING, AND REFRIGERATOR (S1103)

INSTALL AND EXECUTE APPLICATION FOR
AIR CONDITIONER, LIGHTING, AND REFRIGERATOR (S1104)

SERVICE PROVIDING TERMINAL CONNECTION METHOD AND APPARATUS

RELATED APPLICATIONS

This application claims priority from Korean Patent Application No. 10-2012-0153708, filed on Dec. 26, 2012, and Korean Patent Application No. 10-2013-0049622 filed on May 2, 2013, in the Korean Intellectual Property Office, the disclosures of which are incorporated herein by reference in their entireties.

BACKGROUND

1. Field

Apparatuses and methods consistent with exemplary embodiments relate to a method and apparatus for connecting a device to a service providing terminal, and more particularly to, a method and apparatus for connecting a device to a service providing terminal by using another device connected to the service providing terminal and for controlling a service.

2. Description of the Related Art

There are methods of directly controlling a provided service directly by using a service providing terminal as well as remotely controlling the provided service by using another device connected to the service providing terminal when service is provided by using the service providing terminal.

However, other than a device that specifically controls a service, when another device is connected to a service providing terminal and controls a service, there may be inconveniences due to a process of connecting another device to the service providing terminal and authenticating another device.

SUMMARY

One or more embodiments provide a method and an apparatus for connecting another device, other than a device connected to a service providing device, to the service providing device, and for controlling a service provided by using the service providing device.

According to an aspect of an exemplary embodiment, there is provided a method for device control performed by a first device to control services provided by a service providing device. The method includes connecting, through out-of-band communication, to a second device that is configured to include identification information related to the service providing device, receiving, through the out-of-band communication, the identification information related to the service providing device from the second device, executing at least one application related to the identification information, connecting, through in-band communication, to the service providing device using the identification information, and controlling, from the first device, services provided by the service providing device.

The identification information related to the service providing device may include a list of services that may be controlled by the first device.

The list of services that is configured to be controlled by the first device may include services controlled through an application that is being executed in the second device.

The method may further include transmitting, through the out-of-band communication, a media access control (MAC) address of the first device to the second device, wherein the connecting, through the in-band communication, to the service providing device includes receiving a connection request from the service providing device in response to the received MAC address of the first device from the second device, and connecting the service providing device through the in-band communication according to the connection request.

The identification information related to the service providing device may include capability information of the service providing device, an encryption key, authentication information, and connection information used to connect the service providing device through the in-band communication.

The method may further include performing an authentication process with the second device connected through the out-of-band communication.

The connecting, through the in-band communication, to the service providing device using the identification information may include connecting the service providing device by using a result of performing the authentication process through the out-of-band communication.

The connecting, through the in-band communication, to the service providing device using the identification information may include receiving, from the service providing device, a list of services that are configured to be controlled by the first device according to the connecting of the service providing device through the in-band communication.

The controlling of the services provided by the service providing device may include controlling the services when the first device is determined to be within a predetermined distance from the second device.

The first device may be determined to be within the predetermined distance from the second device when the first device enables the out-of-band communication with the second device.

The connecting, through the out-of-band communication, to the second device that is configured to include identification information related to the service providing device may include performing the connecting by using one of near field communication (NFC) and Bluetooth low energy (BLE) communication.

The identification information related to the service providing device may include identification information of the at least one application or an execution command thereof.

According to an aspect of another exemplary embodiment, there is provided a method for device control performed by a second device to allow a first device to control services provided by a service providing device. The method includes executing at least one application related to the service providing device, connecting a first device through out-of-band communication, and transmitting identification information related to the service providing device to the first device, wherein the identification information is related to the at least one application.

The identification information related to the service providing device may include a list of services that may be controlled by the first device.

The list of services may include services controlled through an application that is being executed in the second device.

The second device may exclude the services that are configured to that be controlled by the second device from the list of services transmitted to the first device.

The method may further include receiving an MAC address from the first device, and transmitting the received MAC address and information requesting connection from the first device to the service providing device.

The identification information related to the service providing device may include capability information of the service providing device, an encryption key, authentication information, and connection information used to connect the service providing device through in-band communication.

The method may further include performing an authentication process of authenticating the first device through the out-of-band communication.

The out-of-band communication may be performed by using one of NFC and BLE communication.

The identification information related to the service providing device may include identification information of the at least one application or an execution command thereof.

According to an aspect of another exemplary embodiment, there is provided a method for device control performed by a service providing device providing services that are configured to be controlled by a second device. The method includes connecting a first device through in-band communication, obtaining identification information related to the first device from the first device, determining services that are configured to be controlled by the first device based on the obtained identification information, and controlling the services provided by the service providing device according to the determined services and a control command received from the first device.

The identification information may include a result of authenticating the first device from the second device, wherein the determining of the services that are configured to be controlled by the first device may include determining a list of the services that may be controlled by the first device when the first device is authenticated by the second device.

According to an aspect of another exemplary embodiment, there is provided a method for device control performed by a service providing device providing services that may be controlled by a second device. The method includes obtaining identification information related to a first device from the second device, connecting the first device through in-band communication using the identification information, determining services that are configured to be controlled by the first device based on the obtained identification information, and controlling the services provided by the service providing device according to the determined services and a control command received from the first device.

The identification information related to the first device may include an MAC address of the first device.

According to an aspect of another exemplary embodiment, there is provided a first device including a first communicator configured to connect, through out-of-band communication, to a second device that includes identification information related to a service providing device, and receive the identification information related to the service providing device from the second device, a second communicator configured to connect, through in-band communication, to the service providing device by using the received identification information, and a controller configured to execute at least one application related to the received identification information and control the services provided by the service providing device.

The identification information related to the service providing device may include a list of services that may be controlled by the first device.

The list of services that may be controlled by the first device may include services controlled through an application that is being executed in the second device.

The first communicator may be configured to transmit an MAC address of the first device to the second device, and wherein the second communicator may be configured to receive a connection request from the service providing device that is configured to receive the MAC address of the first device from the second device and is configured to connect the service providing device through in-band communication according to the connection request.

The identification information related to the service providing device may include capability information of the service providing device, an encryption key, authentication information, and connection information configured to connect the service providing device through in-band communication.

The first device may further include an authentication request unit configured to perform an authentication process with the second device connected through the first communicator.

The second communicator may be configured to be connected to the service providing device by using a result of the authentication process performed by the authentication request unit.

The second communicator may be configured to receive a list of services that are configured to be controlled by the first device from the service providing device, and wherein the controller is configured to control the services included in the received list.

The controller may be configured to control the services in response to the first device being determined to be within a predetermined distance from the second device.

The controller may be configured to determine that the first device is within the predetermined distance from the second device when the first communicator is further configured to enable the out-of-band communication with the second device.

The out-of-band communication may be one of NFC and BLE communication.

The identification information related to the service providing device may include identification information of the at least one application or an execution command thereof.

According to an aspect of another exemplary embodiment, there is provided a second device including an out-of-band communicator for transmitting identification information related to a service providing device to a first device through out-of-band communication, and a controller for executing at least one application related to the service providing device, wherein the identification information is related to the at least one application.

The identification information related to the service providing device may include a list of services that may be controlled by the first device.

The list of services may include services controlled through an application that is being executed in the second device.

The controller may be configured to exclude the services that are configured to be controlled by the second device from the list of services transmitted to the first device.

The out-of-band communicator may be configured to receive an MAC address from the first device, and transmit the received MAC address and information requesting a connection from the first device to the service providing device.

The identification information related to the service providing device may include capability information of the service providing device, an encryption key, authentication information, and connection information used to connect the service providing device through in-band communication.

The second device may further include an authentication processing unit configured to perform an authentication process that authenticates the first device through the out-of-band communication.

The out-of-band communication may be performed by using one of NFC and BLE communication.

The identification information related to the service providing device may include identification information of the at least one application or an execution command thereof.

BRIEF DESCRIPTION OF THE DRAWINGS

These and/or other aspects will become apparent and more readily appreciated from the following description of the exemplary embodiments, taken in conjunction with the accompanying drawings in which:

FIG. 4 is a flowchart of a process in which a service providing device is connected to a first device and controls a service, according to an exemplary embodiment;

FIG. 5 is a flowchart of a process in which a service providing device is connected to a first device and controls a service, according to another exemplary embodiment;

DETAILED DESCRIPTION

Figure 1:
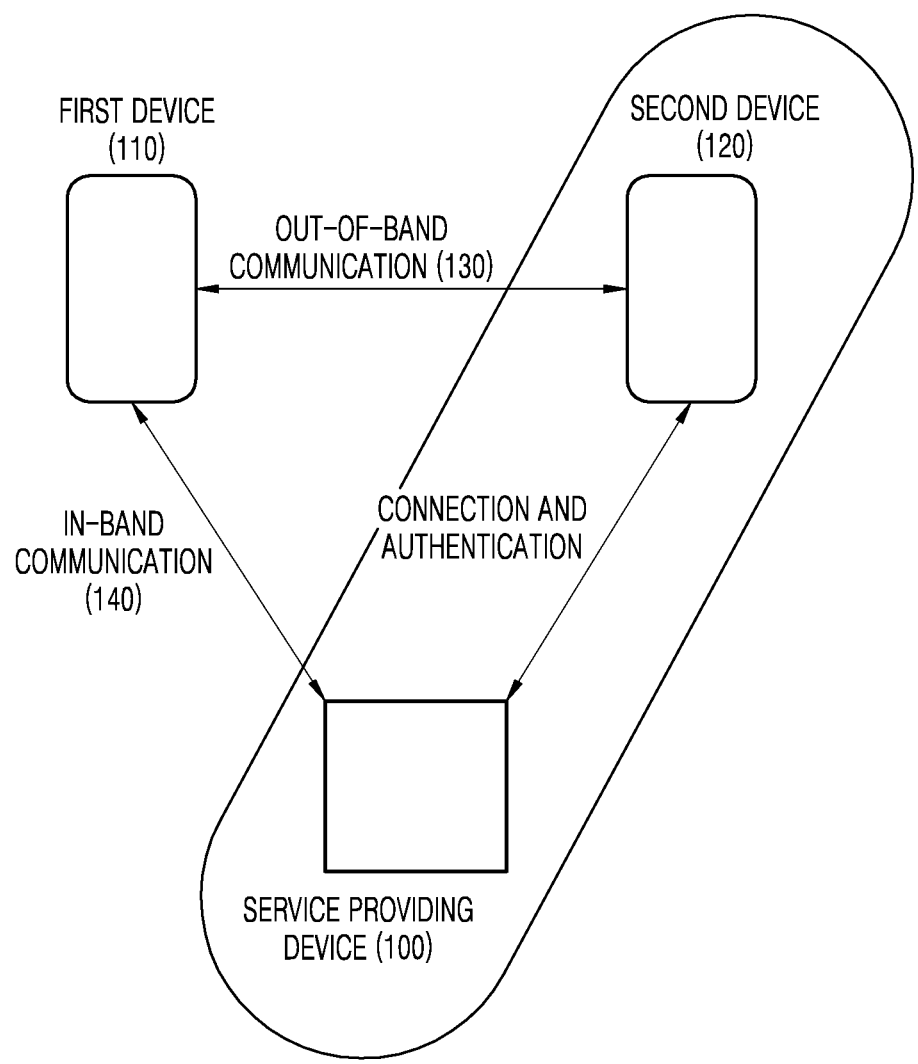
FIG. 1 is a schematic diagram of a connection structure between devices, according to an exemplary embodiment.

As the inventive concept allows for various changes and numerous embodiments, particular exemplary embodiments will be illustrated in the drawings and described in detail in the written description. However, this is not intended to limit the inventive concept to particular modes of practice, and it will be appreciated that changes, equivalents, and substitutes may be made without departing from the spirit and technical scope of the inventive concept. In the following description, certain detailed explanations are omitted when it is deemed that they may unnecessarily obscure the essence of the inventive concept.

Throughout the specification, when an element is referred to as being "connected" or "coupled" to another element, it may be "directly connected or coupled" to the other element or "electrically connected or coupled" with intervening elements. When an element is "connected" or "coupled" to another element, it means that the element may communicate with the other element through signal transmission and reception.

When a part "includes" or "comprises" an element, unless there is a particular description contrary thereto, the part may further include other elements.

Terms such as "first" and "second" are used herein merely to describe a variety of constituent elements, but the constituent elements are not limited by the terms. The terms are used only for the purpose of distinguishing one constituent element from another constituent element.

Most of the terms used herein are general terms that are widely used in the technical art to which the inventive concept pertains. However, some of the terms used herein may be created to reflect intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, components, and/or groups thereof, but do not preclude the presence or addition of one or more other features, integers, steps, operations, elements, components, and/or groups thereof.

Throughout the specification, an 'application' refers to a computer program devised to perform specific operations based on a connection between devices that will be described later. For example, the application may include a game application, an instrument playing application, a moving image reproduction application, a music reproduction application, a map application, a broadcasting application, an exercise support application, a medical application, a payment application, a transportation mode (for example, a car, a bus, an airplane, or a ship) automatic navigation application, a peripheral device control application, and the like.

Throughout the specification, an ad-hoc mode wireless local area network (LAN) and an infrastructure mode wireless LAN are examples of a communication mode identified according to whether a relay is used during short distance communication between devices. That is, the ad-hoc mode wireless LAN is an example of a direct communication mode between devices without a relay, and may be a WiFi direct (WFD) communication network. The infrastructure mode wireless LAN is an example of a communication mode between devices through a relay, and may be a WiFi communication network. Thus, the ad-hoc mode wireless LAN throughout the specification is to be understood as being the direct communication mode between devices without any relay, and the infrastructure mode wireless LAN throughout the specification is to be understood as being the communication mode between devices through a relay.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a schematic diagram of a connection structure between devices, according to an exemplary embodiment.

The connection structure between devices according to an exemplary embodiment may include a service providing device 100, a first device 110, and a second device 120. However, elements of the connection structure between devices according to an exemplary embodiment are not limited to those shown in FIG. 1. That is, the connection structure between devices may include more constituent elements than those shown in FIG. 1.

For example, the connection structure between devices may further include a relay. That is, the connection structure between devices may be performed through the relay.

When the connection structure between devices according to an exemplary embodiment does not include the relay, the connection structure between devices may be performed through direct communication between devices. The direct communication between devices may include direct transmission and reception of data between devices without the relay. Examples of the direct communication between devices may include Bluetooth communication, ultra wideband (UWB) communication, Zigbee communication, WiFi direct communication included in wireless local area network (LAN) communication in an ad-hoc mode, etc., but is not limited thereto. The direct communication between devices may be referred to as machine-to-machine (M2M) communication, device-to-device (D2D) communication, or peer to peer (P2P) communication.

According to an exemplary embodiment, the service providing device 100, the first device 110, and the second device 120 may be connected to each other by wire or wirelessly.

According to an exemplary embodiment, the service providing device 100 is a device for providing a user with a service. In this regard, the service may include an operation performed through a single application executed by the service providing device 100. In addition, the service may include a series of operations performed through a combination of a plurality of applications, a program being executed in a background of the service providing device 100, an operation performed through some functions of applications, or an operation performed through a cloud server that is logged into through the service providing device 100. However, the service of the exemplary embodiment is not limited to those described above, and may include other services that are provided by the device 100 which operates according to a definite purpose.

For example, when the service providing device 100 is a head unit for car audio system included in a vehicle, the service may include moving image reproduction through a display apparatus of the head unit or may include controlling peripheral devices in the vehicle through the head unit, but the services are not limited thereto.

The service providing device 100 may be implemented as diverse types of electronic devices such as the head unit included in the vehicle, a home gateway apparatus, a personal computer (PC), etc.

The first device 110 and the second device 120 enable data communication between each other and with the service providing device 100. The first device 110 and the second device 120 may be homogeneous or heterogeneous devices. The first device 110 and the second device 120 may be diverse devices, for example, including cellular phones, smart phones, notebook PCs, tablet PCs, handheld PCs, e-book terminals, digital broadcasting terminals, personal digital assistants (PDAs), portable multimedia players (PMPs), navigation systems, smart TVs, etc., but are not limited thereto.

According to an exemplary embodiment, the first device 110 may be a device that is to be connected to the service providing device 100 through out-of-band communication 130 with the second device 120. The second device 120 may be a device that was completely authenticated after having been connected to the service providing device 100.

For example, when the service providing device 100 is the head unit included in the vehicle, the second device 120 may be a driver's smart phone that was completely authenticated after having been connected to the service providing device 100. In this regard, the first device 110 may be a passenger's smart phone that is to be connected to the service providing device 100.

The first device 110 and the second device 120 may perform communication through or using out-of-band communication 130. In this regard, the out-of-band communication 130 may mean that at least one of bands, channels, ports, and connections are not identical to those of in-band communication 140 performed for data transmission and reception with the service providing device 100.

That is, the first device 110 and the second device 120 may use the in-band communication 140 to provide service. The out-of-band communication 130 may be performed between the first device 110 and the second device 120 to connect the in-band communication 140. In general, the out-of-band communication 130 may be easily connected and enable transmission and reception of a small amount of data. For example, near field communication (NFC) may be used as the out-of-band communication 130 but is not limited thereto.

According to one or more exemplary embodiments, the first device 110 may use the out-of-band communication 130 to determine the service providing device 100 and connect the in-band communication 140 with the service providing device 100. The determining of the service providing device 100 by the first device 110 may include determining which communication method of the in-band communication 140 may be performed by the service providing device 100, and which application may be used to control service provided by the service providing device 100. However, the exemplary embodiments are not limited thereto. The determining of the service providing device 100 by the first device 110 may be referred to as being included in the out-of-band communication 130 performed between the first device 110 and the second device 120 to connect the in-band communication 140.

The out-of-band communication 130 may be referred to as communication performed between the first device 110 and the second device 120 before connecting via the in-band communication 140 between the first device 110 and the service providing device 100. The out-of-band communication 130 may be performed through short distance wireless communication. For example, the out-of-band communication 130 may be performed based on one of an NFC mode, a Bluetooth communication mode, a Bluetooth low energy (BLE) communication mode, and combinations thereof but is not limited thereto.

When the out-of-band communication 130 may be performed through short distance wireless communication, if a distance between the first device 110 and the second device 120 is within a short distance for wireless communication range, the first device 110 may receive data from the second device 120. Alternatively, the first device 110 and the second device 120 may bi-directionally transmit data according to a communication mode.

For example, the first device 110 may read data stored in the second device 120 through the NFC mode. In this case, the second device 120 may perform NFC based on an NFC tag. A distance between the first device 110 and the second device 120 is based on relative locations of the first device 110 and the second device 120.

The Bluetooth low energy (BLE) communication mode has a characteristic of continuously broadcasting information. Thus, when the out-of-band communication 130 is based on the BLE communication mode, the second device 120 may continuously broadcast information used to connect the in-band communication 140 and identification information of the service providing device 100 including identification information of an application. In this regard, the first device 110 and the second device 120 may perform Bluetooth communication.

The second device 120 may transmit identification information related to the service providing device 100 to the first device 110 through the out-of-band communication 130. The identification information related to the service providing device 100 may be used by the first device 110 to connect the service providing device 100 and to control a service. The identification information related to the service providing device 100 may include a list of services that may be controlled by the first device 110, capability information of the service providing device 100, information used to connect via the in-band communication 140, an encryption key, information regarding an application related to the service providing device 100, a connection request signal, a connection acceptance signal, a connection notification signal, authentication information, etc., but is not limited thereto.

The list of services that may be controlled by the first device 110 means a list of services that may be controlled by the first device 110 from among services provided by the service providing device 100 according to one or more exemplary embodiments.

For example, when the service providing device 100 provides a moving image reproduction service, a content search service, and a vehicle control service, the list of services that may be controlled by the first device 110 may include a moving image reproduction service and a content search service only. In this regard, according to one or more exemplary embodiments, the first device 110 may control the moving image reproduction service and the content search service through the in-band communication 140.

According to an exemplary embodiment, the list of services that may be controlled by the first device 110 may include a service controlled through an application executed in the second device 120. The service controlled through the application being executed in the second device 120 is included in the list of services that may be controlled by the first device 110 so that the first device 110 may control the service being controlled by the second device 120.

The capability information of the service providing device 100 means information regarding capability of the service providing device 100. For example, the capability information of the service providing device 100 may include information regarding a communication mode that may be performed by the service providing device 100 and resolution of a display apparatus of the service providing device 100 but is not limited thereto.

The information used to connect the in-band communication 140 includes information used to connect the first device 110 to the service providing device 100 through the in-band communication 140. For example, when the information regarding the communication mode that may be performed by the service providing device 100 is the Bluetooth communication mode, the information used to connect the in-band communication 140 may include a network address of the service providing device 100 such as a media access control (MAC) address of the service providing device 100 and/or an Internet protocol (IP) address of the service providing device 100. The information used to connect the in-band communication 140 according to one or more exemplary embodiments may include at least one of a service set identifier (SSID), a passphrase, a personal identification number (PIN) code, and a fast initial link setup (FILS).

The encryption key includes information that needs to be input for a connection to the service providing device 100 through the in-band communication 140. The encryption key may include information used for connection via the in-band communication 140.

The information regarding the application related to the service providing device 100 may include identification information of at least one application or an execution command to be given to the at least one application but is not limited thereto. The identification information of the at least one application may include information used by the first device 110 to search for an application from the first device 110 or a server storing an application execution file.

The connection request signal is used to request connection via the in-band communication 140. The connection notification signal is used to notify about the connection via the in-band communication 140.

The authentication information may indicate that the first device 110 is allowed to control a service provided by the service providing device 100.

The in-band communication 140 is performed to connect the first device 110 to the service providing device 100 and control the service provided by the service providing device 100 between the first device 110 and the service providing device 100. Examples of the in-band communication 140 may include Bluetooth communication, UWB communication, Zigbee communication, WiFi direct communication included in a wireless LAN in an ad-hoc mode, and wireless WiFi communication in an infrastructure mode but are not limited thereto.

According to an exemplary embodiment, the first device 110 may connect the in-band communication 140 by transmitting a connection request to the service providing device 100. According to another exemplary embodiment, the service providing device 100 may connect the in-band communication 140 by transmitting the connection request to the first device 110. An embodiment in which the first device 110 transmits the connection request to the service providing device 100 will be described in more detail with reference to FIG. 6 later. An embodiment in which the service providing device 100 transmits the connection request to the first device 110 will be described in more detail with reference to FIG. 7 later.

Figure 2:
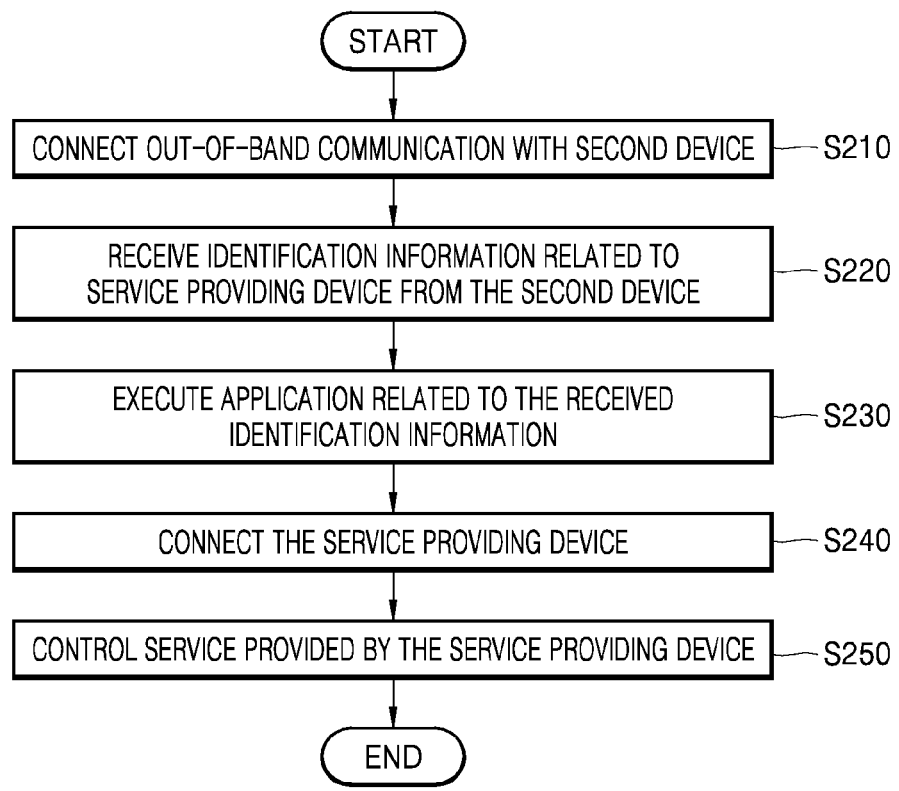
FIG. 2 is a flowchart of a process in which a first device is connected to a service providing device and controls a service, according to an exemplary embodiment.

FIG. 2 is a flowchart of a process in which the first device 110 is connected to the service providing device 100 and controls a service, according to an exemplary embodiment.

The first device 110 may be connected to the second device 120 through out-of-band communication (operation S210).

In this regard, the first device 110 may perform an authentication process with the second device 120 through out-of-band communication. The authentication process is a process of authenticating the first device 110 as a device for controlling a service provided by the service providing device 100. The authentication process may be selectively performed according to one of mutual authentication and one-way authentication. According to another exemplary embodiment, the authentication process may be performed according to a challenge-response authentication protocol.

In this regard, according to an exemplary embodiment, out-of-band communication may be performed through one of NFC, BLE communication, and Bluetooth communication but is not limited thereto.

Thereafter, the first device 110 may receive identification information related to the service providing device 100 from the second device 120 through out-of-band communication (operation S220).

According to an exemplary embodiment, the identification information related to the service providing device 100 may include a list of services that may be controlled by the first device 110. In this regard, the list of services that may be controlled by the first device 110 may include a service controlled through an application executed in the second device 120.

Thereafter, the first device 110 may execute an application related to the received identification information (operation S230). In this regard, the identification information related to the service providing device 100 may include application identification information used to identify the application or an execution command to be given to the application. The application related to the received identification information is the application corresponding to the application identification information.

According to an exemplary embodiment, the identification information related to the service providing device 100 may include at least one of capability information of the service providing device 100, an encryption key, authentication information, and connection information used to connect the service providing device 100 through in-band communication.

Thereafter, the first device 110 may connect via in-band communication to the service providing device 100 by using the received identification information (operation S240).

According to an exemplary embodiment, when the first device 110 is a device authenticated by performing the authentication process through out-of-band communication, the first device 110 may connect via in-band communication to the service providing device 100 by using a result of the authenticating.

According to another exemplary embodiment, the first device 110 may be authenticated by performing the authentication process through the service providing device 100 while connecting via in-band communication.

According to an exemplary embodiment, the first device 110 may transmit an MAC address of the first device 110 to the second device 120 through out-of-band communication. Thereafter, the second device 120 may transmit the MAC address of the first device 110 and information used to request the first device 110 for connection, to the service providing device 100. Thereafter, the first device 110 may receive a connection request from the service providing device 100 and connect via in-band communication to the service providing device 100 according to the connection request.

Thereafter, the first device 110 may control the service provided by the service providing device 100 based on in-band communication (operation S250). In this regard, the first device 110 may transmit a control command to be given to the service to the service providing device 100.

According to an exemplary embodiment, the first device 110 may control only the service provided by the service providing device 100 that is included in a list of services included in the identification information related to the service providing device 100 through out-of-band communication.

According to another exemplary embodiment, the first device 110 may receive the list of services that may be controlled by the first device 110 from the service providing device 100 when connected via in-band communication. Thereafter, the first device 110 may control only the service provided by the service providing device 100 that is included in the received list of services.

The first device 110 may control the service provided by the service providing device 100 only in a case where the first device 110 is determined within a predetermined distance from the second device 120. According to an exemplary embodiment, when the first device 110 enables out-of-band communication with the second device 120, the first device 110 may be determined within the predetermined distance from the second device 120. For example, when out-of-band communication is performed through Bluetooth communication that may be performed within a range of from about 10 meters to about 100 meters, the first device 110 may determine whether the second device 120 is within the predetermined distance according to whether the first device 110 enables communication with the second device 120 through Bluetooth communication.

Figure 3:
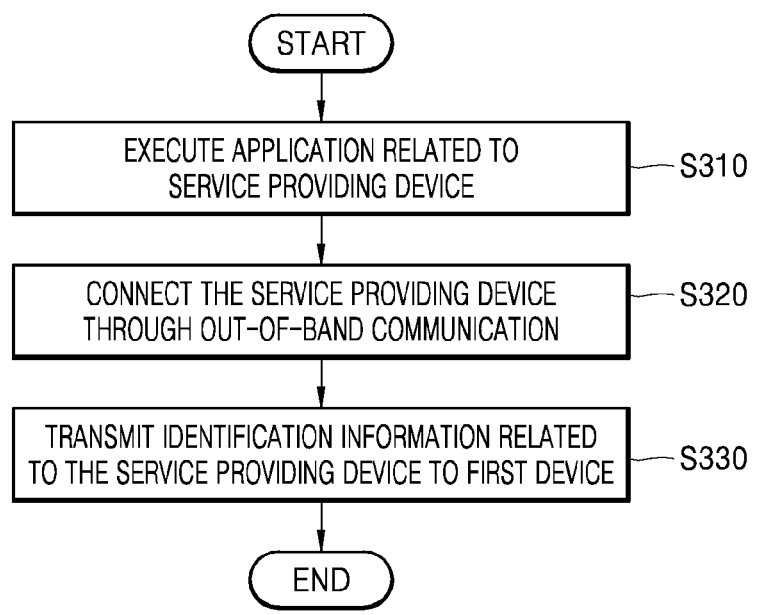
FIG. 3 is a flowchart of a process in which a second device provides information used to connect to a service providing device, to a first device, according to an exemplary embodiment.

FIG. 3 is a flowchart of a process in which the second device 120 provides information used to connect to the service providing device 100 to the first device 110, according to an exemplary embodiment.

The second device 120 may execute an application related to the service providing device 100 (operation S310).

In this regard, the second device 120 may store information related to the service providing device 100 including the information used to connect to the service providing device 100 and authentication information by being connected to the service providing device 100.

The application related to the service providing device 100 may be an application for controlling a service provided by the service providing device 100.

Thereafter, the second device 120 is connected to the first device 110 through out-of-band communication (operation S320), and thus transmits identification information related to the service providing device 100 to the first device 110 (operation S330).

In this regard, the identification information related to the service providing device 100 may include at least one of a list of services that may be controlled by the first device 110, capability information of the service providing device 100, an encryption key, authentication information, and connection information used to connect the service providing device 100 through in-band communication.

The list of services that may be controlled by the first device 110 may be related to at least one application being executed in the service providing device 100. For example, the list of services that may be controlled by the first device 110 may include a service controlled through at least one application or a service selected through at least one application.

According to an exemplary embodiment, the identification information related to the service providing device 100 may include identification information of at least one application or an execution command to be given to at least one application.

According to an exemplary embodiment, the second device 120 may prevent a service included in the list of services, that may be controlled by the first device 110 that is transmitted to the first device 110, from being controlled by the first device 110 by withholding the transmission of the service information. That is, the second device 120 may exclude the service included in the list of services that is transmitted to the first device 110 from among services that may be controlled by the second device 120.

According to an exemplary embodiment, the second device 120 may receive an MAC address from the first device 110. The second device 120 may transmit the receive MAC address and information used to request a connection from the first device 110 to the service providing device 100.

According to an exemplary embodiment, the second device 120 may perform an authentication process of authenticating the first device 110 through out-of-band communication. For example, the second device 120 may transmit identification information of the service providing device 100 including authentication information of the service providing device 100 to the first device 110 through out-of-band communication.

Out-of-band communication may be performed by using one of NFC, BLE communication, and Bluetooth communication.

FIG. 4 is a flowchart of a process in which the service providing device 100 is connected to the first device 110 and controls a service, according to an exemplary embodiment.

The service providing device 100 may be connected to the first device 110 through in-band communication (operation S410).

Thereafter, the service providing device 100 may obtain identification information of the first device 110 from the first device 110 (operation S420).

In this regard, the identification information of the first device 110 may include an authentication result received from the second device 120 by performing an authentication process in the first device 110.

Thereafter, the service providing device 100 may determine services that may be controlled by the first device 110 (operation S430).

In this regard, when the first device 100 is a device authenticated by the second device 120, services that may be controlled by the first device 110 may be determined. For example, the service providing device 100 may be a head unit included in a vehicle, the second device 120 may be a driver's smart phone, and the first device 110 may be a passenger's device. In this regard, when it is determined that the passenger's device that is authenticated through the driver's smart phone is connected to the head unit, the head unit may determine that the passenger's device may control a content reproduction service and a content search service.

According to an exemplary embodiment, the service providing device 100 may transmit a list of the determined services to the first device 110.

Thereafter, the service providing device 100 may control the determined services and a service according to a control command received from the first device 110 (operation S440).

FIG. 5 is a flowchart of a process in which the service providing device 100 is connected to the first device 110 and controls a service, according to another exemplary embodiment.

The service providing device 100 may obtain identification information of the first device 110 from the second device 120 (operation S510). In this regard, the service providing device 100 may be connected to the second device 120 through communication based on a previous record of a connection to the second device 120. The service providing device 100 may receive the identification information of the first device 110 as well as information used to request the first device 110 for connection from the second device 120.

According to an exemplary embodiment, the identification information of the first device 110 may include an MAC address of the first device 110 but is not limited thereto.

Thereafter, the service providing device 100 may request the first device 110 for communication connection by using the received identification information of the first device 110. The service providing device 100 may be connected to the first device 110 through in-band communication according to a communication connection request (operation S520).

Thereafter, the service providing device 100 may determine services that may be controlled by the first device 110 (operation S530).

According to an exemplary embodiment, the service providing device 100 may transmit a list of determined services to the first device 110.

Thereafter, the service providing device 100 may control the determined services and a service according to a control command received from the first device 110 (operation S540).

Figure 6:
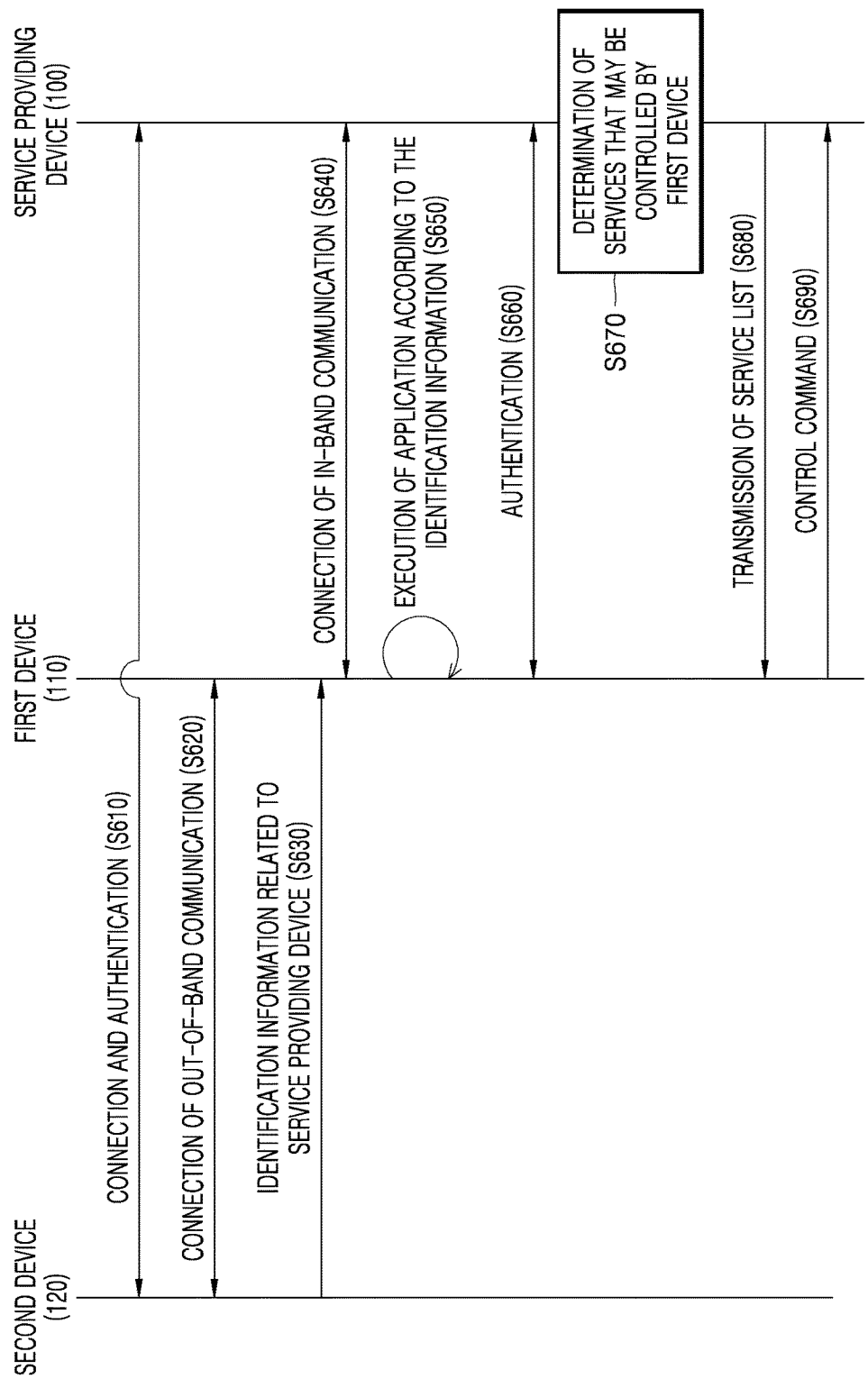
FIG. 6 is a flowchart of operations of a first device, a second device, and a service providing device, according to an exemplary embodiment.

FIG. 6 is a flowchart of operations of the first device 110, the second device 120, and the service providing device 130, according to an exemplary embodiment.

The second device 120 may be connected to the service providing device 100 and complete authentication (operation S610). That is, the second device 120 may store identification information related to the service providing device 100 when previously connected to the service providing device 100.

Thereafter, the first device 110 is connected to the second device 120 through out-of-band communication (operation S620). Thus, the first device 110 may receive the identification information related to the service providing device 100 from the second device 120 (operation S630).

Thereafter, the first device 110 may be connected to the service providing device 100 through in-band communication (operation S640). In this regard, the first device 110 may search for the service providing device 100 based on the identification information related to the service providing device 100 and transmit a connection request to the service providing device 100.

The first device 110 may execute an application according to the identification information related to the service providing device 100 (operation S650). Operation S650 may be performed prior to operation S640, and is not necessarily performed after operation S640.

In this regard, the first device 110 may determine whether the application according to the identification information related to the service providing device 100 is installed in the first device 110. When the application, according to the identification information related to the service providing device 100, is not installed in the first device 110, the first device 110 may install and execute the application. When the identification information related to the service providing device 100 includes information indicating a location in which a file for installing the application is stored, the first device 110 may download the file for installing the application from a server. For example, when the identification information related to the service providing device 100 includes uniform resource locator (URL) information, the first device 110 may download the file for installing the application by using the URL information.

Thereafter, the first device 110 may be authenticated with respect to the service providing device 100 (operation S660). According to an exemplary embodiment, operation S660 may perform an authentication process in operation S640 of connecting via in-band communication. According to another exemplary embodiment, the first device 110 may be authenticated based on out-of-band communication with the second device 120.

Thereafter, the service providing device 100 may determine services that may be controlled by the first device 110 (operation S670). When the first device 110 is connected to the service providing device 100 through out-of-band communication between the first device 110 and the second device 120, the service providing device 100 may allow the first device 110 to control services differentially from the second device 120.

That is, when the second device 120 may control all services provided by the service providing device 100, the service providing device 100 may allow the first device 110 to control some of services provided by the service providing device 100.

Thereafter, the service providing device 100 may transmit a list of determined services to the first device 110 (operation S680).

However, prior to operation S630, the second device 120 may determine a list of services that may be controlled by the first device 110. In this case, the identification information related to the service providing device transmitted in operation S630 may include the list of the determined services. In this regard, operations S670 and S680 may be skipped.

Thereafter, the first device 110 may transmit control commands used to control services provided by the service providing device 100 to the service providing device 100 (operation S690).

Figure 7:
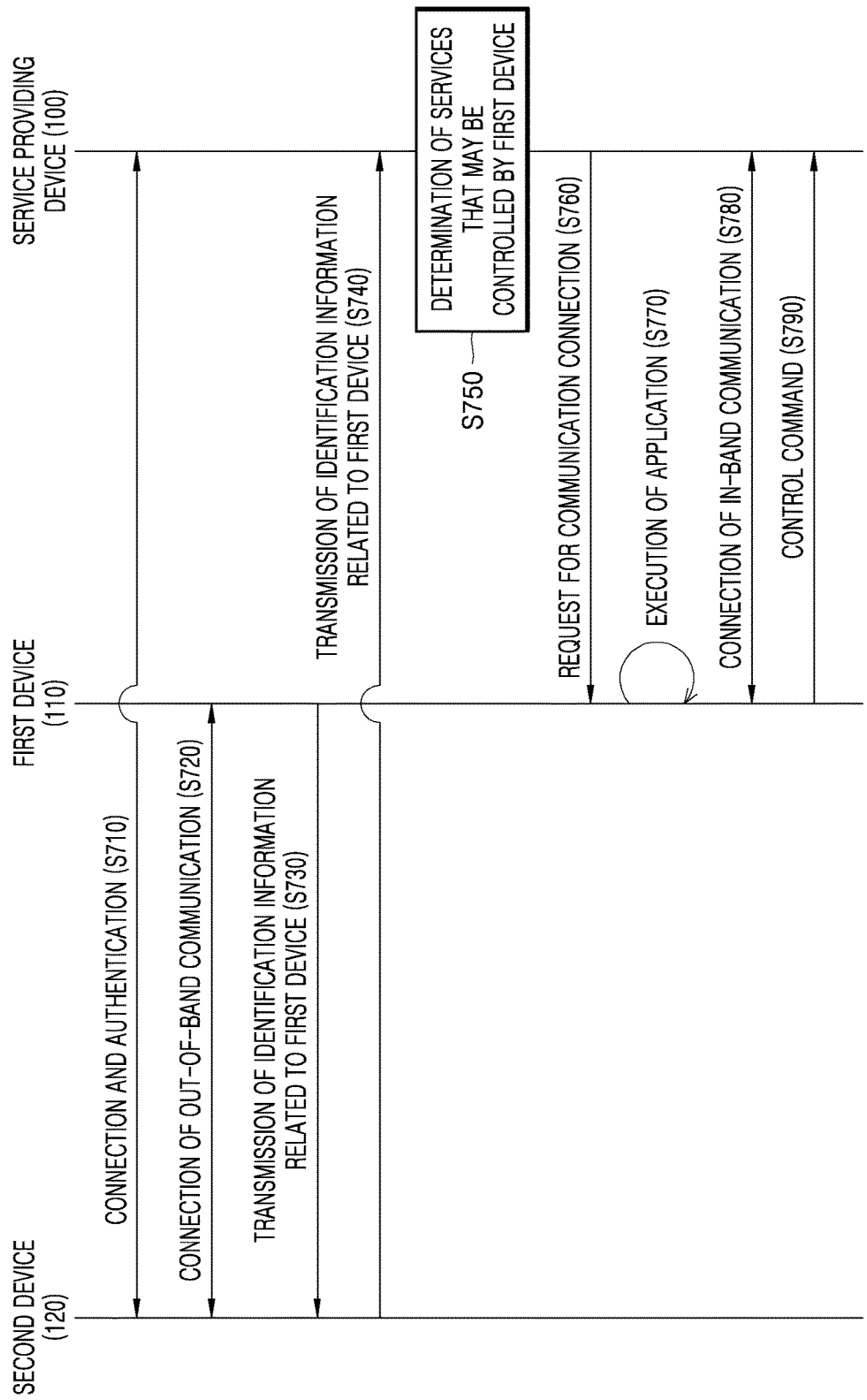
FIG. 7 is a flowchart of operations of a first device, a second device, and a service providing device, according to another exemplary embodiment.

FIG. 7 is a flowchart of operations of a first device, a second device, and a service providing device, according to another exemplary embodiment.

The second device 120 may be connected to the service providing device 100 and complete authentication (operation S710). That is, the second device 120 may store identification information related to the service providing device 100 when previously connected to the service providing device 100.

The first device 110 may be connected to the second device 120 through out-of-band communication (operation S720). According to an exemplary embodiment, out-of-band communication may be performed according to one of NFC, BLE communication, and Bluetooth communication but is not limited thereto.

The first device 110 may transmit identification information related to the first device 110 to the second device 120 (operation S730). In this regard, the identification information related to the first device 110 may include connection information used to connect to the first device 110. For example, a network ID such as an MAC address of the first device 110 may be included in the connection information used to connect to the first device 110.

The second device 120 may transmit the identification information related to the first device 110 to the service providing device 100 (operation S740).

The service providing device 100 may determine services that may be controlled by the first device 110 (operation S750). When the first device 110 is connected to the service providing device 100 through out-of-band communication between the first device 110 and the second device 120, the service providing device 100 may allow the first device 110 to be authorized to control services differentially from the second device 120.

That is, when the second device 120 may control all services provided by the service providing device 100, the service providing device 100 may allow the first device 110 to control some of services provided by the service providing device 100.

The service providing device 100 may request a communication connection from the first device 110 based on the identification information related to the first device 110 (operation S760). In this regard, the service providing device 110 may transmit the identification information related to the service providing device 100 to the first device 110. The identification information related to the service providing device 100 may include a list of determined services.

The first device 110 may execute an application related to the identification information related to the service providing device 100 (operation S770).

In this regard, the first device 110 may determine whether the application related to the identification information related to the service providing device 100 is installed in the first device 110. When the application related to the identification information related to the service providing device 100 is not installed in the first device 110, the first device 110 may install and execute the application. When the identification information related to the service providing device 100 includes information indicating a location in which a file for installing the application is stored, the first device 110 may download the file for installing the application from a server. For example, when the identification information related to the service providing device 100 includes URL information, the first device 110 may download the file for installing the application by using the URL information.

The first device 110 may be connected to the service providing device 100 through in-band communication (operation S780), and transmit a control command to the service providing device 100 (operation S790).

Figure 8:
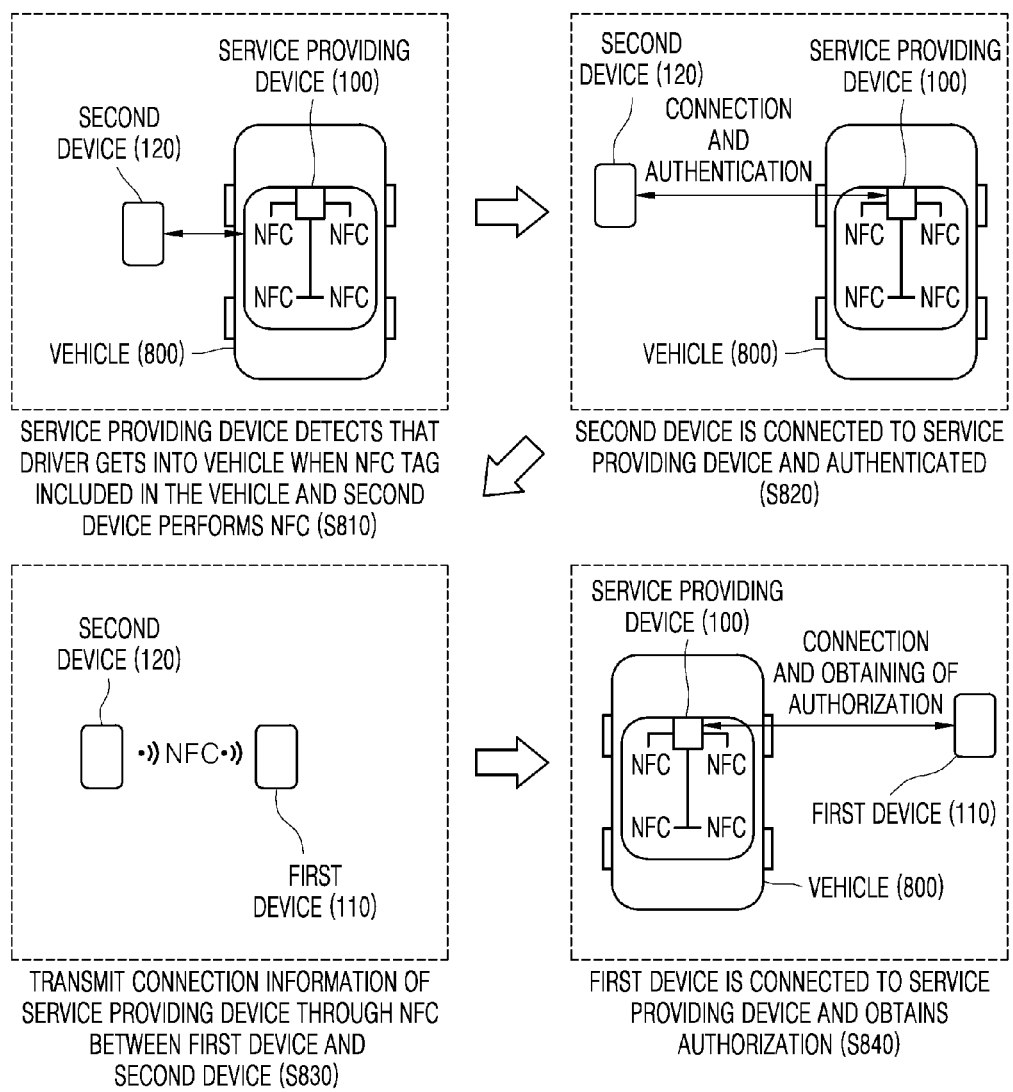
FIG. 8 shows an example in which a first device is connected to a service providing device included in a vehicle, according to an exemplary embodiment.

FIG. 8 shows an example in which the first device 110 is connected to the service providing device 100 included in a vehicle 800, according to an exemplary embodiment.

According to an exemplary embodiment, the service providing device 100 may be included in the vehicle 800. For example, the service providing device 100 may be implemented in a head unit included in the vehicle 800.

The vehicle 800 may include an NFC tag used to read or transmit information for each seat. The NFC tag may transmit information read from another device to the service providing device 100.

The service providing device 100 may detect that a driver gets into the vehicle 800 when the NFC tag included in the vehicle 800 and the second device 120 perform NFC (operation S810). In this regard, the NFC tag that performs NFC with the second device 120 may be mounted in a driving seat of the vehicle 800.

Thereafter, the second device 120 may be connected to the service providing device 100 and authenticated (operation S820). In this regard, the second device 120 may store identification information related to the service providing device 100.

Thereafter, when the second device 120 and the first device 110 are connected to each other through NFC, the first device 110 may read the identification information related to the service providing device 100 that is stored in the second device 120.

Thereafter, the first device 110 may be connected to the service providing device 100 based on the identification information related to the service providing device 100, and may control services provided by the service providing device 100 (operation S840). In this regard, the first device 110 may execute an application for controlling services based on the identification information related to the service providing device 100. When the application for controlling services is not installed in the first device 110, the first device 110 may download a file for installing the application and install the application.

Figure 9:
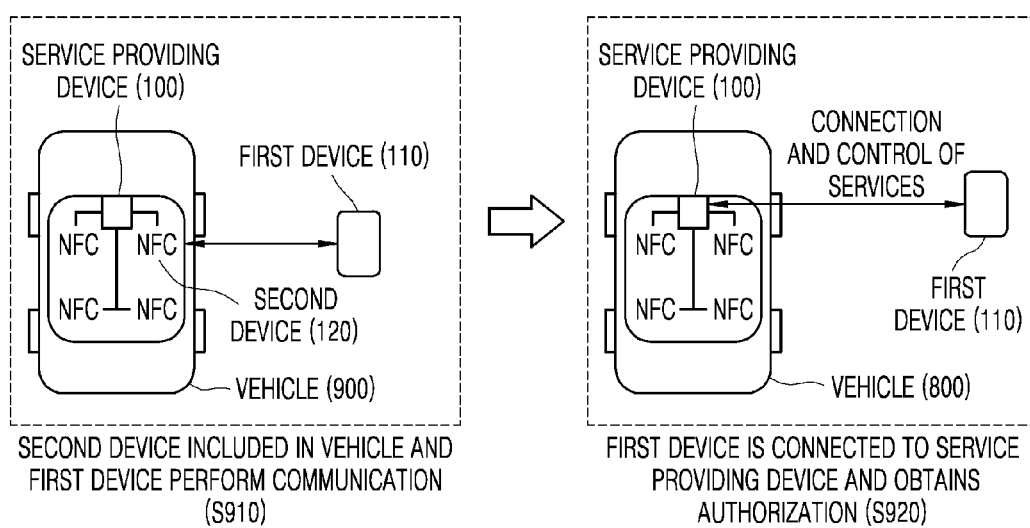
FIG. 9 shows an example in which a first device is connected to a service providing device included in a vehicle, according to another exemplary embodiment.

FIG. 9 shows an example in which the first device 110 is connected to the service providing device 100 included in a vehicle 900, according to another exemplary embodiment.

According to an exemplary embodiment, the second device 120 may be included in each seat of the vehicle 900. In this regard, the second device 120 may be implemented by using an NFC tag. According to the exemplary embodiment, the second device 120 may transmit information to the service providing device 100.

NFC may be performed between the second device 120 included in the vehicle 900 and the first device 110 (operation S910). In this regard, the first device 110 may read identification information related to the service providing device that is stored in the second device 120.

The first device 110 may execute an application for controlling a service. When the application for controlling service is not installed in the first device 110, the first device 110 may download a file for installing the application and install the application.

The first device 110 may be connected to the service providing device 100 and obtain control authorization with respect to services provided by the service providing device 100 (operation S920).

Figure 10:
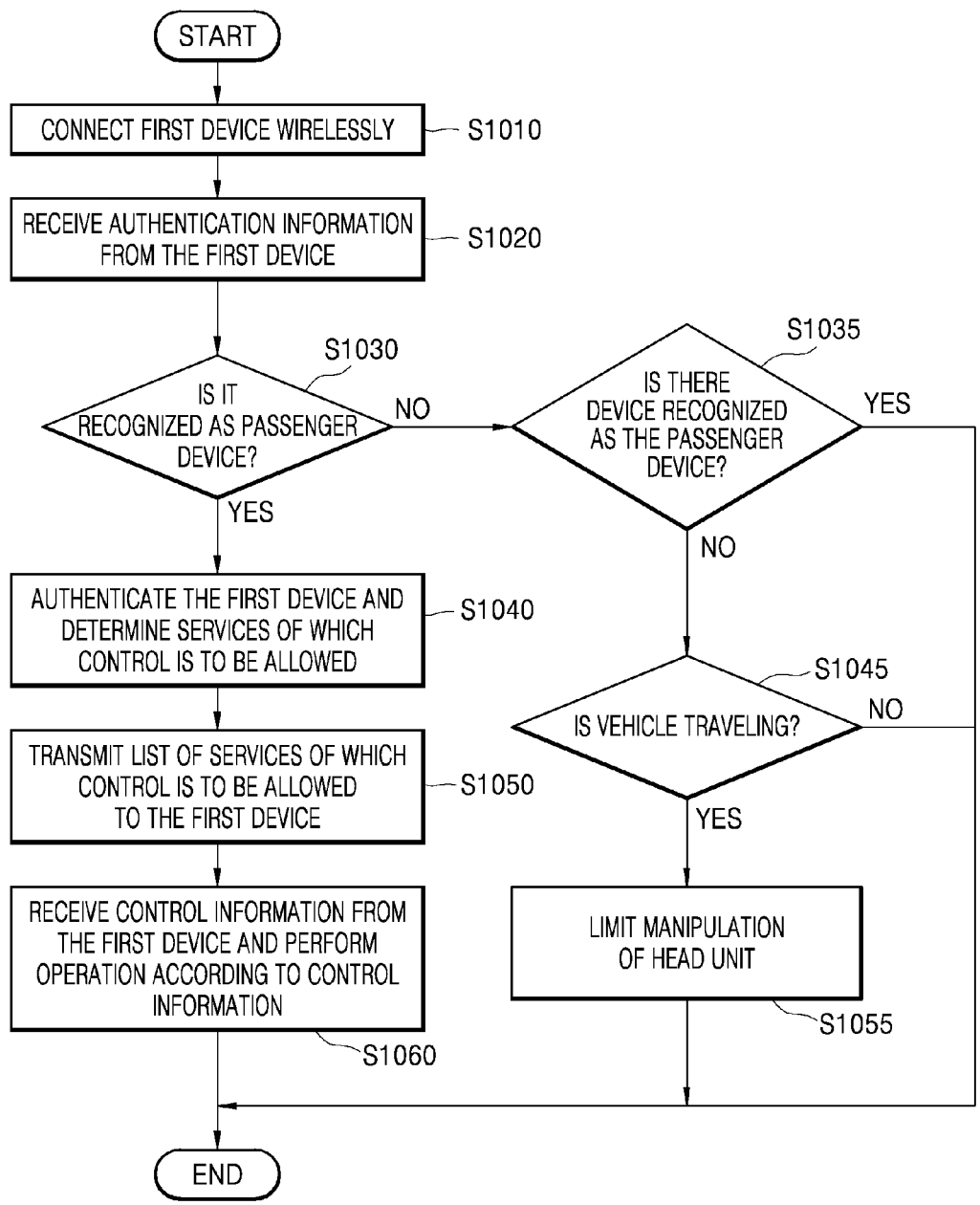
FIG. 10 is a flowchart of a process in which a service providing device included in a vehicle sets authorization to control services, according to an exemplary embodiment.
Figure 11A:
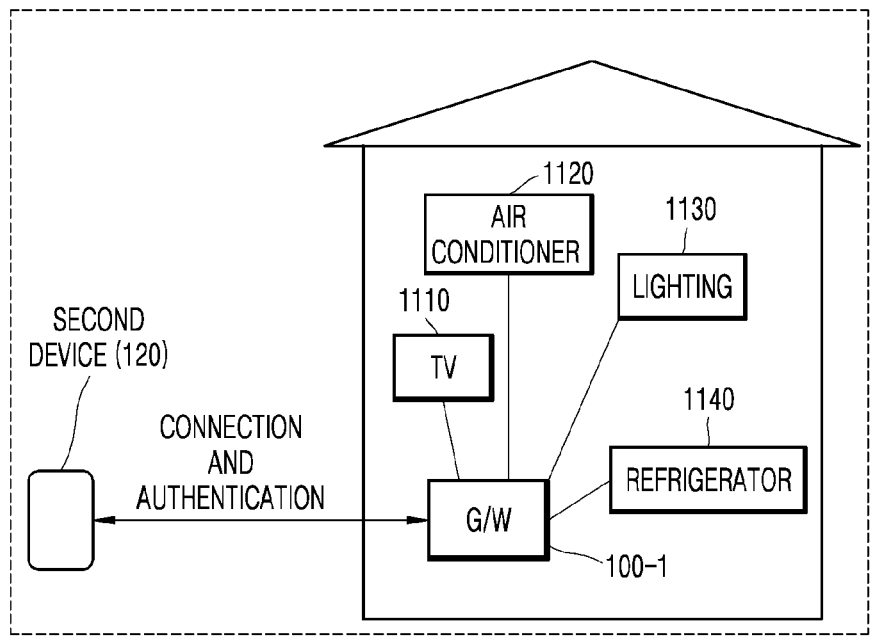
FIGS. 11A through 11E show examples in which a first device controls devices connected to a gateway, according to an exemplary embodiment.
Figure 11B:
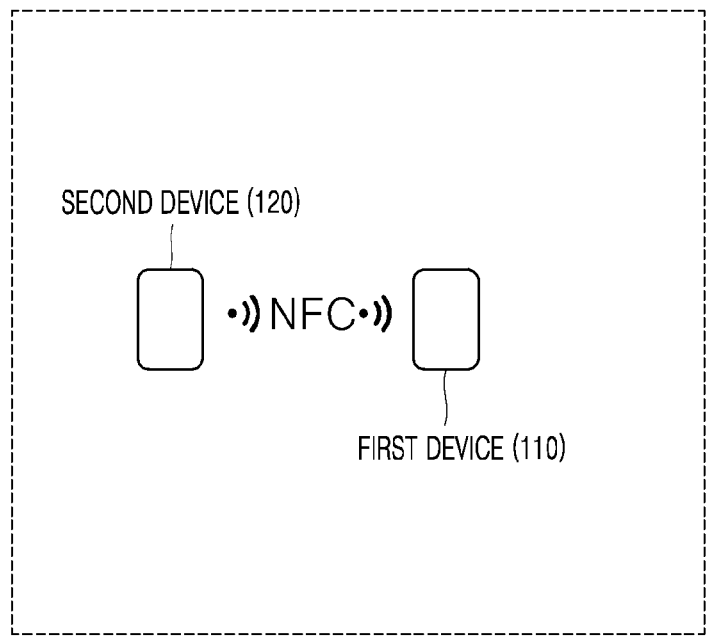
Figure 11C:
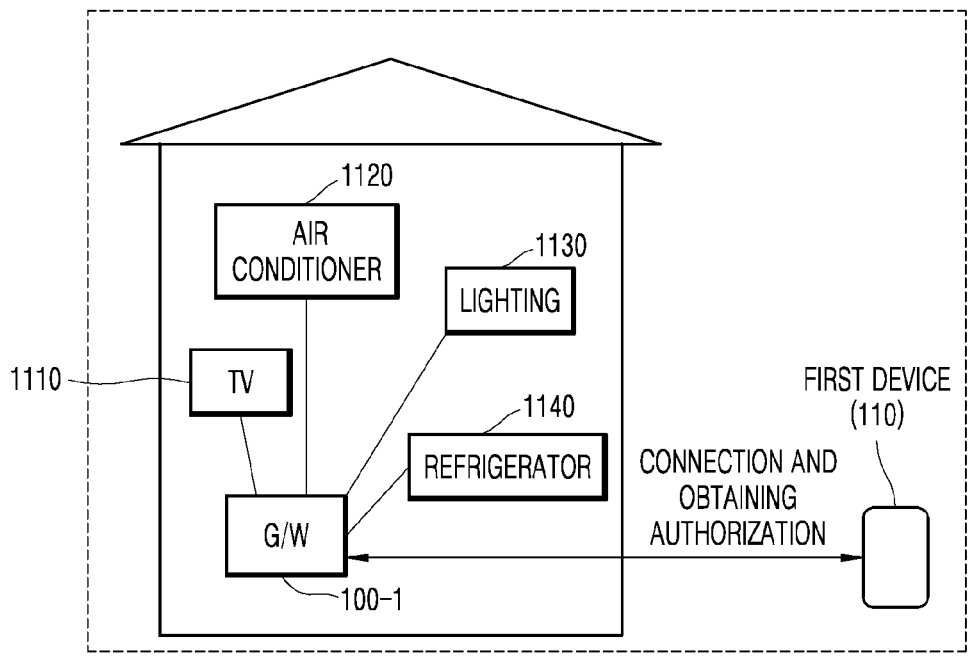
Figure 11D:
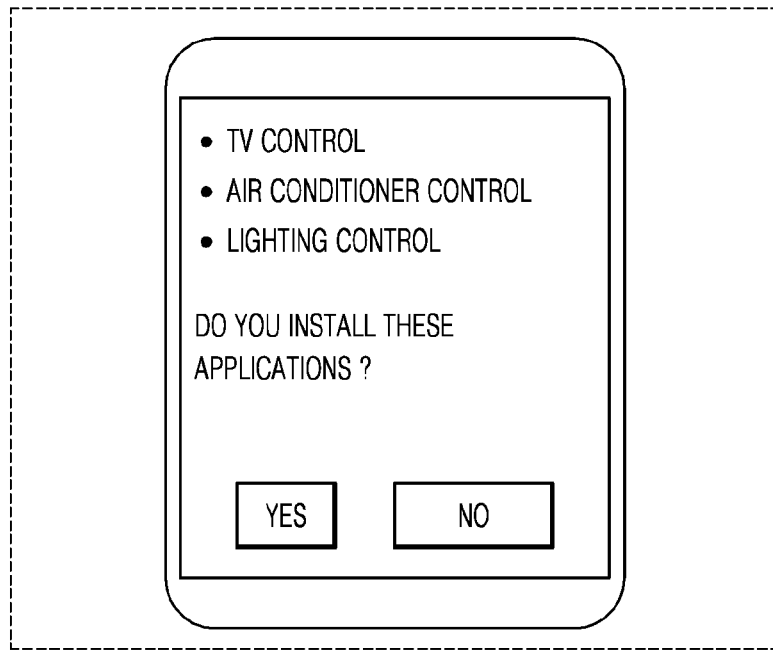
Figure 11E:
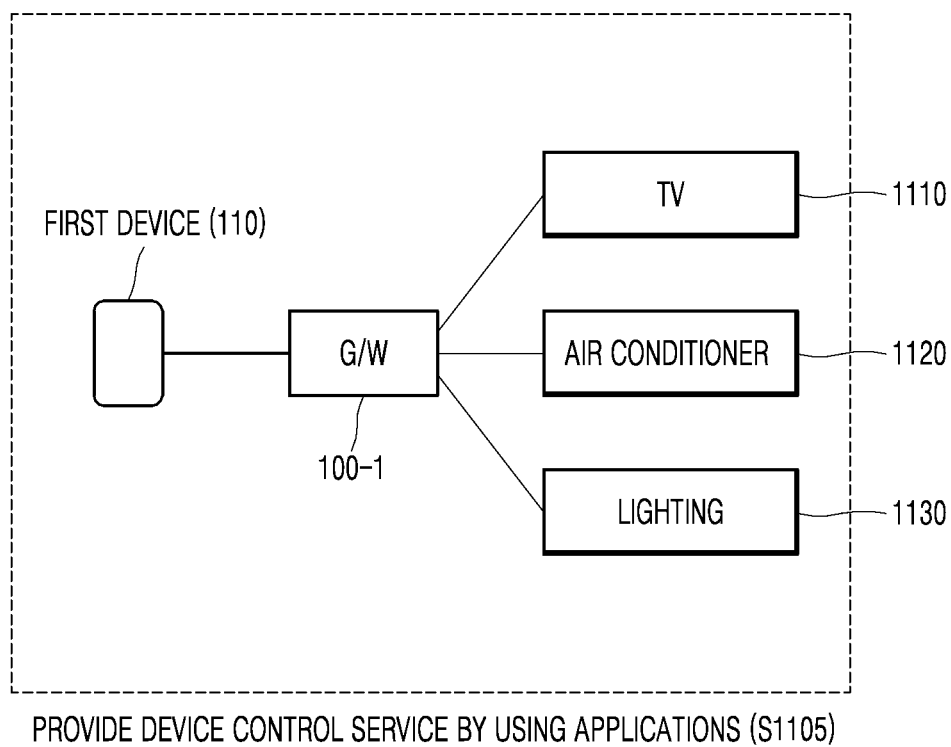

FIG. 10 is a flowchart of a process in which the service providing device 100 included in a vehicle sets authorization to control services, according to an exemplary embodiment.

According to the exemplary embodiment, the process of FIG. 10 may apply when the service providing device 100 is a head unit included in the vehicle.

The service providing device 100 may be connected to the first device 110 wirelessly (operation S1010). In this regard, a wireless connection between the first device 110 and the service providing device 100 means in-band communication. According to an exemplary embodiment, the first device 110 may transmit a connection request to the service providing device 100 by using identification information related to the service providing device 100.

The service providing device 100 may receive authentication information from the first device 110 (operation S1020). In this regard, the first device 110 may receive the authentication information from the second device 120.

The service providing device 100 may determine whether the first device 110 is a passenger's device rather than a driver's device (operation S1030). A device that is recognized as the passenger's device by the service providing device 100 may be referred to as a passenger device below. For example, when the authentication information received by the first device 110 is received from the second device 120 that is the driver's device, the first device 110 may be determined as the passenger device. In this regard, the second device 120 may be completely connected to and authenticated by the service providing device 100 before the process of FIG. 10 is performed.

When the first device 110 is determined as the passenger's device in operation S1030, the service providing device 100 may authenticate the first device 110 as the passenger device and determine services of which control is to be allowed by the first device 110 (operation S1040).

Thereafter, the service providing device 100 may transmit a list of determined services to the first device 110 (operation S1050). Thereafter, the service providing device 100 may receive control information from the first device 110 and perform an operation according to the received control information (operation S1060).

When the first device 110, in operation S1030, is determined as the driver's device that was completely connected to and authenticated by the service providing device 100 before the process of FIG. 10 is performed, the service providing device 100 may determine whether there is a passenger's device connected to the service providing device 100 (operation S1035).

When there is no passenger's device connected to the service providing device 100 in operation S1035, and the vehicle is traveling (operation S1045), services provided by the service providing device 100 may not be controlled (operation S1055). Manipulation of the head unit is limited like in operation S1055, and thus the head unit of the vehicle that is traveling may be manipulated only when a passenger gets into the vehicle.

FIGS. 11A through 11E show examples in which the first device 110 controls devices connected to a gateway 100-1, according to an exemplary embodiment.

The second device 120 may be connected to the gateway 100-1 of a home network and may be authenticated as a device that may control devices connected to the home network (operation S1101). The second device 120 may store connection information used to connect to the gateway 100-1 and authentication information by performing operation S1101.

In this regard, the gateway 100-1 may provide services for controlling devices connected to the gateway 100-1 as the service providing device 100. In the examples of FIGS. 11A through 11E, the gateway 100-1 may control devices connected to the gateway 100-1 such as a TV 1110, an air conditioner 1120, lighting 1130, and a refrigerator 1140.

Thereafter, the first device 110 may obtain the connection information used to connect to the gateway 100-1 that is stored in the second device 120 through out-of-band communication (operation S1102). According to an exemplary embodiment, out-of-band communication may be performed based on NFC.

The first device 110 may be connected to the gateway 100-1 by using the connection information obtained in operation S1102 and obtain authorization to control devices connected to the gateway 100-1 wholly or partly (operation S1103). In this regard, according to an exemplary embodiment, a range of devices that may be controlled by the first device 110 may be determined by transmitting a list of devices that may be controlled from the second device 120 to the first device 110. According to another exemplary embodiment, the range of devices that may be controlled by the first device 110 may be determined during a process in which the gateway 100-1 recognizes a connection to the first device 110.

Communication between the first device 110 and the gateway 100-1 is in-band communication. According to an exemplary embodiment, in-band communication may be performed based on WiFi communication.

Thereafter, the first device 110 may perform applications for controlling devices connected to the gateway 100-1 (operation S1104). In this regard, when applications for controlling devices are not installed in the first device 110, the first device 110 may install applications for controlling devices.

According to an exemplary embodiment, applications for controlling devices may be separately installed in devices that obtained authorization to control devices according to the obtained authority. According to another embodiment, an application may enable/disable a function for controlling each device according to the obtained authorization.

Thereafter, the first device 110 may control devices connected to the gateway 100-1 by using the installed applications (operation S1105).

Figure 12:
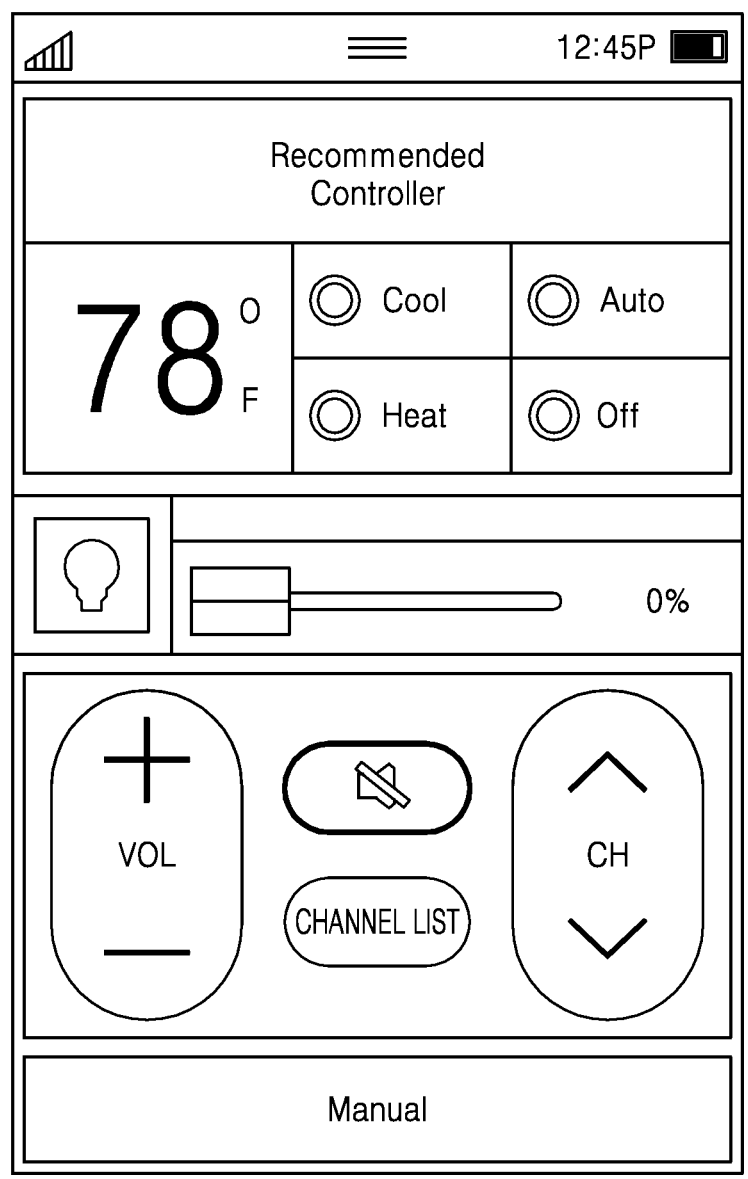
FIG. 12 shows a user interface (UI) displayed on a first device to control devices connected to a gateway, according to an exemplary embodiment.

FIG. 12 shows a user interface (UI) displayed on the first device 110 to control devices connected to a gateway, according to an exemplary embodiment.

When the first device 110 obtains control authorization of an air conditioner, lighting, and a TV according to the process of FIGS. 11A through 11E, the first device 110 may display the UI of FIG. 12 but is not limited thereto.

Figure 13:
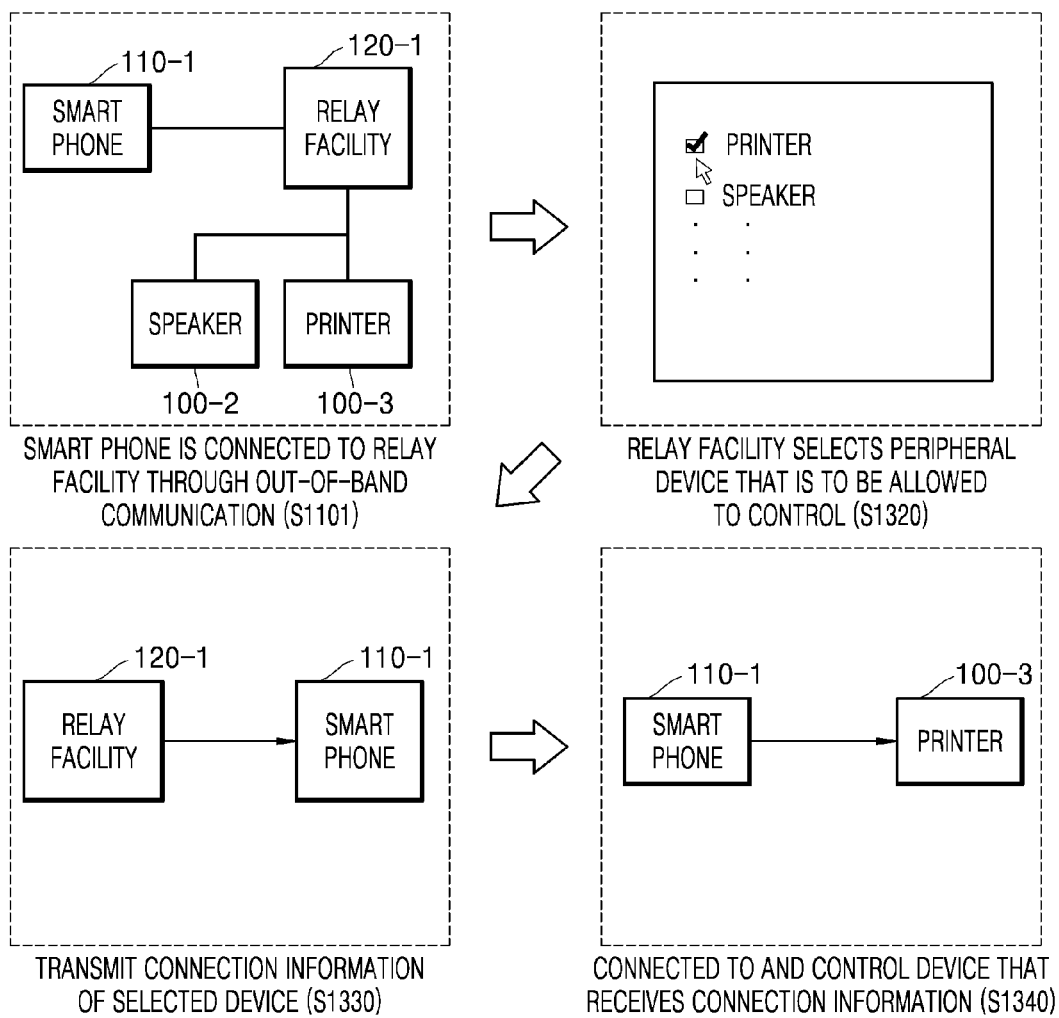
FIG. 13 shows an example in which a first device controls devices connected to a service providing device, according to an exemplary embodiment.

FIG. 13 shows an example in which the first device 110 controls devices connected to the service providing device 100, according to an exemplary embodiment.

A smart phone 110-1 may be connected to a relay facility 120-1 through out-of-band communication (operation S1310). In this regard, out-of-band communication may be performed by using diverse methods such as WiFi communication, NFC, and BLE communication.

The smart phone 110-1 is a device that may install an optional application and perform data communication with a device by using at least one communication method.

The relay facility 120-1 is a relay facility to which optional devices may be connected. The relay facility 120-1 may be implemented as a device that merely functions as a connection point or as computing equipment including a processor. Peripheral devices such as a speaker 100-2 and a printer 100-3 may be connected to the relay facility 120-1.

Thereafter, the relay facility 120-1 may select a peripheral device that is to be allowed to control the smart phone 110-1 (operation S1320).

According to an exemplary embodiment, the relay facility 120-1 may output a UI for selecting all or some of peripheral devices connected to the relay facility 120-1. The relay facility 120-1 may select a peripheral device that is to be allowed to control the smart phone 110-1 according to an input to the UI.

Thereafter, the relay facility 120-1 may transmit connection information of a device selected as the smart phone 110-1 (operation S1330). The smart phone 110-1 may be connected to and control the peripheral device based on the connection information received from the relay facility 120-1 (operation S1340).

According to the embodiment of FIG. 13, a user of the smart phone 110-1 may use the smart phone 110-1 to perform out-of-band communication according to NFC through the relay facility 120-1 installed in a public place, and thus the smart phone 110-1 may control a document print service through the printer 100-3.

Figure 14:
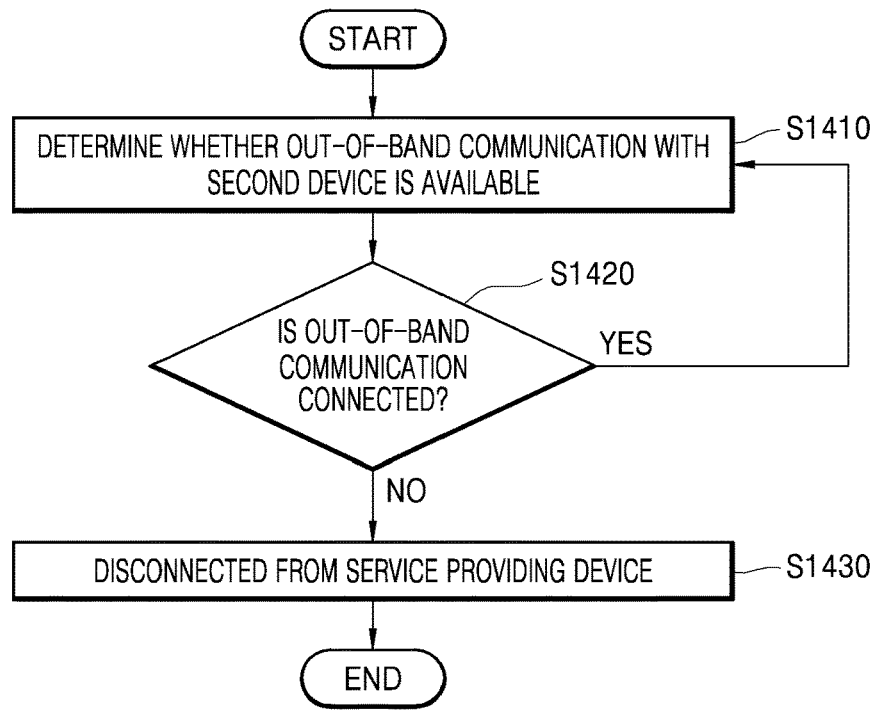
FIG. 14 is a flowchart of a process in which a first device is disconnected from a service providing device, according to an exemplary embodiment.

FIG. 14 is a flowchart of a process in which the first device 110 is disconnected from the service providing device 100, according to an exemplary embodiment.

The first device 110 determines whether the first device 110 and the second device 120 may perform out-of-band communication (operation S1410).

When the first device 110 is not connected to the second device 120 through out-of-band communication (operation S1420), the first device 110 may be disconnected from the service providing device 100 through in-band communication (operation S1430).

When out-of-band communication is performed based on short distance wireless communication such as Bluetooth communication within a range of several meters or several tens of meters, the process of disconnecting in-band communication of FIG. 14 may apply to one or more exemplary embodiments.

Figure 15:
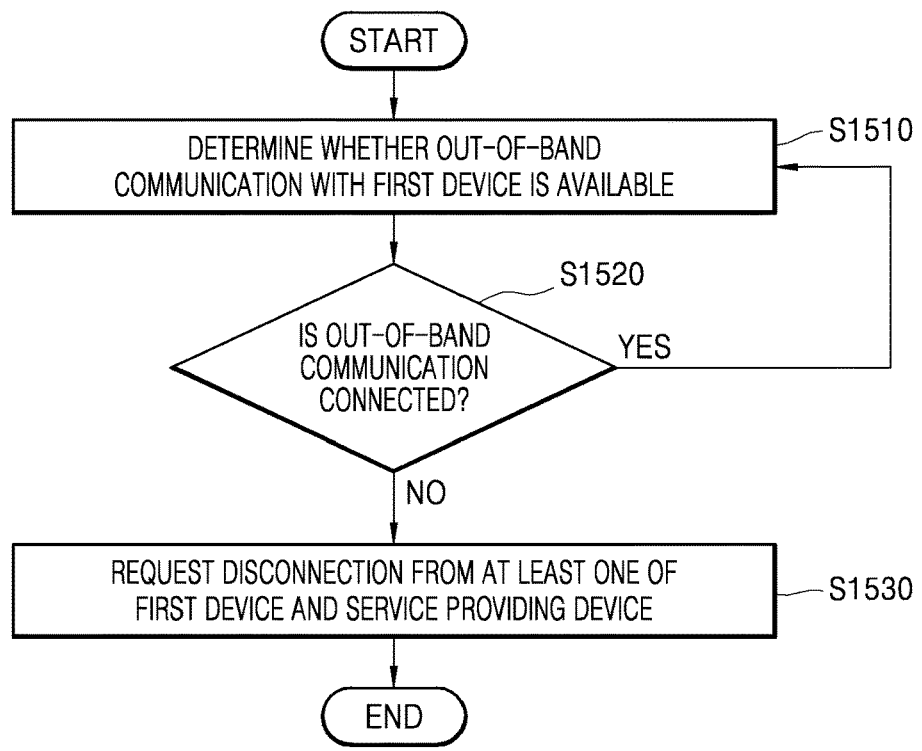
FIG. 15 is a flowchart of a process in which a second device disconnects a first device from a service providing device, according to an exemplary embodiment.

FIG. 15 is a flowchart of a process in which the second device 120 disconnects the first device 110 from the service providing device 100, according to an exemplary embodiment.

The second device 120 determines whether the second device 120 and the first device 110 may perform out-of-band communication (operation S1510).

When the second device 120 is not connected to the first device 110 through out-of-band communication (operation S1520), the second device 120 may request disconnection from at least one of the first device 110 and the service providing device 100 through in-band communication (operation S1530).

When out-of-band communication is performed based on short distance wireless communication such as Bluetooth communication within a range of several meters or several tens of meters, the process of disconnecting in-band communication of FIG. 15 may apply to one or more exemplary embodiments.

Figure 16:
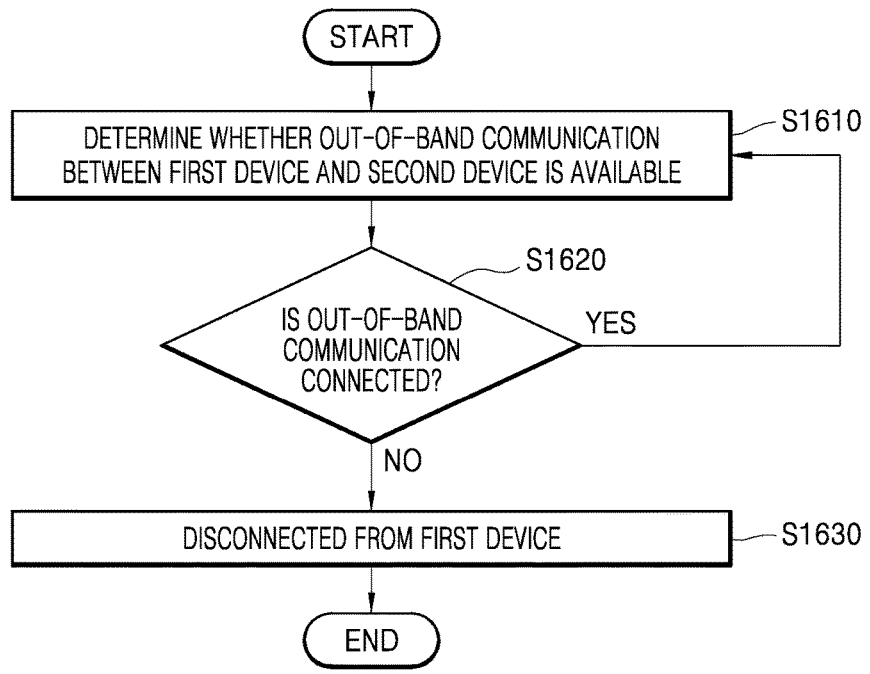
FIG. 16 is a flowchart of a process in which a service providing device is disconnected from a first device, according to an exemplary embodiment.

FIG. 16 is a flowchart of a process in which the service providing device 100 is disconnected from the first device 110, according to an exemplary embodiment.

The service providing device 100 may determine whether the first device 110 and the second device 120 may perform out-of-band communication (operation S1610). In this regard, according to one or more exemplary embodiments, the service providing device 100 may determine whether the first device 110 and the second device 120 may perform out-of-band communication by transmitting an inquiry regarding whether out-of-band communication is available to the first device 110 or the second device 120.

When the service providing device 100 determines that the first device 110 and the second device 120 perform out-of-band communication (operation S1620), the service providing device 100 may be disconnected from the first device 110 through in-band communication (operation S1630).

According to an exemplary embodiment, when out-of-band communication is performed based on short distance wireless communication such as Bluetooth communication within a range of several meters or several tens of meters, the process of disconnecting in-band communication of FIG. 16 may apply to one or more exemplary embodiments.

Figure 17:
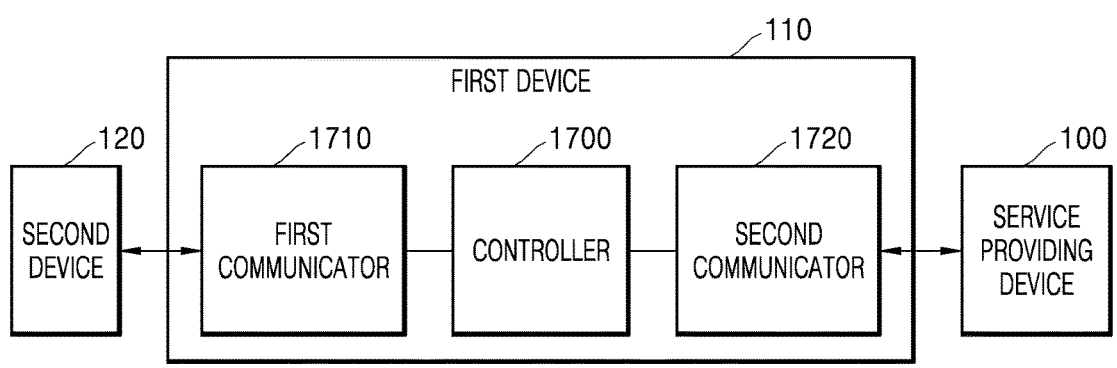
FIG. 17 is a schematic block diagram of a first device, according to an exemplary embodiment.

FIG. 17 is a schematic block diagram of the first device 110, according to an exemplary embodiment.

The first device 110 according to an exemplary embodiment may include a first communicator 1710 that connects using out-of-band communication between the first device 110 and the second device 120 and receives identification information related to the service providing device 100 from the second device 120, a second communicator 1720 may connect using in-band communication between the first device 110 and the service providing device 100 by using the received identification information, and a controller may control the above elements, executes at least one application related to the received identification information, and controls services provided by the service providing device 100.

In this regard, the identification information related to the service providing device 100 may include a list of services that may be controlled by the first device 110. The list of services that may be controlled by the first device 110 may include a service controlled through an application that is executed in the second device 120. Thus, the service controlled by the second device 120 may be controlled by the first device 110.

According to an exemplary embodiment, the first communicator 1710 may transmit a network ID of the first device 110 to the second device 120. In this regard, the network ID means information used to identify a location of a device on a network such as an MAC address.

In this regard, the second device 120 may transmit the network ID of the first device 110 and a connection request for in-band communication to the service providing device 100. The service providing device 100 may transmit the connection request for in-band communication to the first device 110. The first device 110 that receives the connection request for in-band communication from the service providing device 100 may be connected to the service providing device 100 through in-band communication according to the received connection request.

The identification information related to the service providing device 100 may include at least one of capability information of the service providing device 100, an encryption key, authentication information, and connection information used to connect the service providing device 100 through in-band communication.

Although not shown in FIG. 17, the first device 110 may further include an authentication request unit that performs an authentication process with the second device 120 through the first communicator 1710. The second communicator 1720 may connect the first device 110 to the service providing device 100 by using a result of the authentication process performed by the authentication request unit.

The second communicator 1720 may receive a list of services that may be controlled by the first device 110 from the service providing device 100. The controller 1700 may control services included in the received list. In this regard, the controller 1700 may execute applications for controlling services included in the received list. When applications for controlling services are not installed in the first device 110, the controller 1700 may install applications for controlling services by using the identification information related to the service providing device 100.

According to an exemplary embodiment, the controller 1700 may control services only when the first device 110 is determined to be within a predetermined distance from the second device 120. In this regard, when the first communicator 1710 enables communication with the second device 120, the controller 1700 may determine that the first device 110 is within the predetermined distance from the second device 120.

In this regard, out-of-band communication performed by the first communicator 1710 may be performed based on one of NFC, BLE communication, and Bluetooth communication.

The identification information related to the service providing device 100 may include identification information of at least one application or an execution command thereof.

Figure 18:
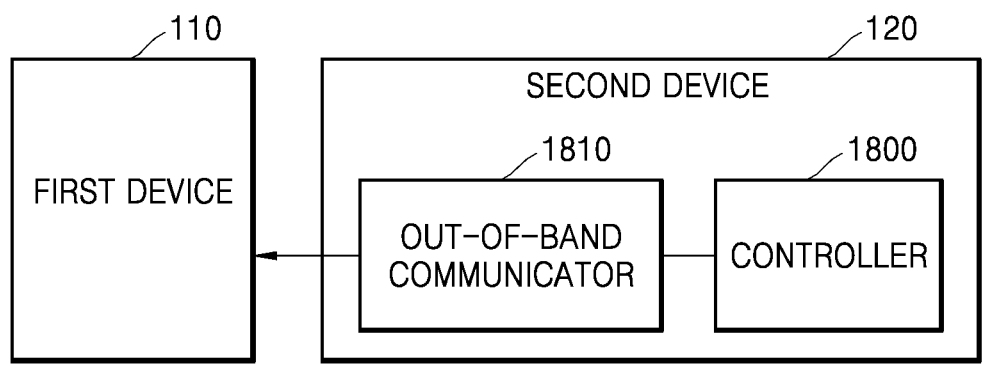
FIG. 18 is a schematic block diagram of a second device, according to an exemplary embodiment.

FIG. 18 is a schematic block diagram of the second device 120, according to an exemplary embodiment.

The second device 120 according to an exemplary embodiment may include an out-of-band communicator 1810 that transmits identification information related to the service providing device 100 to the first device 110 through out-of-band communication and a controller 1800 that executes at least one application related to the service providing device 100.

In this regard, the identification information related to the service providing device 100 may be related to at least one application. For example, identification information used to identify applications or a URL for installing applications may be included in the identification information related to the service providing device 100.

Figure 19:
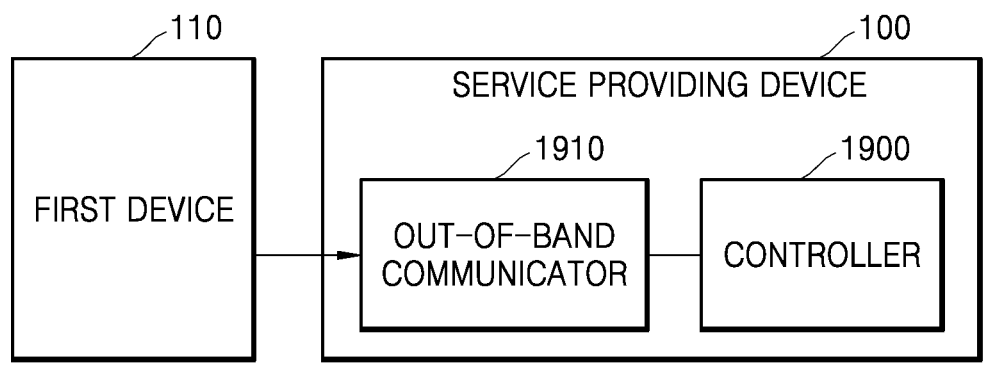
FIG. 19 is a schematic block diagram of a service providing device, according to an exemplary embodiment.

FIG. 19 is a schematic block diagram of the service providing device 100, according to an exemplary embodiment.

The service providing device 100 according to an exemplary embodiment may include an in-band communicator 1910 that performs in-band communication with the first device 110 and a controller 1900 that controls each element of the service providing device 100 and controls services provided by the service providing device 100.

An exemplary embodiment may be realized in a form of a recording medium including a program module executed by a computer and a command executed by the same computer. A computer readable medium includes an arbitrary available medium and also includes volatile and non-volatile media and removable and non-removable media. Additionally, a computer readable medium may include a computer storage medium and a communication medium. The computer storage medium includes volatile and non-volatile media and removable and non-removable media, which are realized through an arbitrary method or technique for storing information on a computer readable command, a data structure, a program module, or other data. The communication medium typically includes a computer readable command, a data structure, a program module, or other data of a modulated data signal.

While exemplary embodiments have been particularly shown and described, it will be understood by those of ordinary skill in the art that various changes in form and details may be made therein without departing from the spirit and scope of the inventive concept as defined by the following claims. Therefore, the above-mentioned embodiments are just exemplary in all respects, and the inventive concept is not limited thereto. For example, each single component may be separated into multiple components which are then separately implemented. Also, separated components may be combined together and implemented as a single component.

Therefore, the scope of the inventive concept is defined not by the detailed description but by the appended claims, and all differences within the scope will be construed as being included therein.

What is claimed is:

1. A method for device control performed by a first device to control a service provided by a service providing device, the service providing device being included in a vehicle, the method comprising:
   connecting, through a first out-of-band communication, to a second device that includes identification information related to the service providing device, wherein the second device is connected to the service providing device through in-band communication for receiving service information from the service providing device and is connected to the service providing device through a second out-of-band communication for authorization to control the service provided by the service providing device and to allow the first device to control the service provided by the service providing device;
   receiving, through the first out-of-band communication, the identification information related to the service providing device from the second device;
   executing at least one application related to the identification information;
   connecting, through the in-band communication, to the service providing device using the identification information; and
   controlling, the service provided by the service providing device,
   wherein the second device communicates with the service providing device through bi-directional communication and controls the service providing device by a processor included in the second device,
   wherein the second device receives a list of services provided by the service providing device, according to the second device being authenticated as a driver device, and transmits at least one service that is controlled by the first device from the list of services provided by the service providing device to the first device according to the first device being authenticated as a passenger device, and
   wherein the list of services provided by the service providing device includes at least one service that is controlled by the second device and at least one service whose control by the second device is blocked when the vehicle is driving.

2. The method of claim 1, wherein the identification information related to the service providing device comprises a list of services that are controllable by the first device.

3. The method of claim 2, wherein the list of services controllable by the first device comprises services controlled through an application that is being executed in the second device.

4. The method of claim 1, further comprising:
   transmitting, through the first out-of-band communication, a media access control (MAC) address of the first device to the second device,
   wherein the connecting, through the in-band communication, to the service providing device comprises:
   receiving a connection request from the service providing device in response to the received MAC address of the first device from the second device; and
   connecting the service providing device through the in-band communication according to the connection request.

5. The method of claim 1, wherein the identification information related to the service providing device comprises:
   capability information of the service providing device;
   an encryption key;
   authentication information; and
   connection information used to connect the service providing device through the in-band communication.

6. The method of claim 1, further comprising performing an authentication process with the second device connected through the first out-of-band communication.

7. The method of claim 6, wherein the connecting, through the in-band communication, to the service providing device using the identification information comprises connecting the service providing device by using a result of the performing the authentication process through the first out-of-band communication.

8. The method of claim 1, wherein the connecting, through the in-band communication, to the service providing device using the identification information comprises receiving, from the service providing device, a list of services controllable by the first device according to the connecting of the service providing device through the in-band communication.

9. The method of claim 1, wherein the controlling of the service provided by the service providing device comprises: controlling the service when the first device is determined to be within a predetermined distance from the second device.

10. The method of claim 9, wherein the first device is determined to be within the predetermined distance from the second device when the first device enables the first out-of-band communication with the second device.

11. The method of claim 1, wherein the connecting, through the first out-of-band communication, to the second device that includes identification information related to the service providing device comprises: performing the connecting by using one of near field communication (NFC) and Bluetooth low energy (BLE) communication.

12. The method of claim 1, wherein the identification information related to the service providing device comprises identification information of the at least one application or an execution command thereof.

13. A non-transitory computer readable recording medium storing one or more programs comprising commands for executing the method of claim 1.

14. The method of claim 1, further comprising:
   displaying a user interface including the at least one service that is controlled by the first device.

15. A method for device control performed by a second device to allow a first device to control services provided by a service providing device, the service providing device being included in a vehicle, the method comprising:
   executing at least one application related to the service providing device;
   connecting the first device through a first out-of-band communication; and
   transmitting identification information related to the service providing device to the first device,
   wherein the identification information is related to the at least one application and the second device is connected to the service providing device through in-band communication for receiving service information from the service providing device and is connected to the service providing device through a second out-of-band communication for authorization to control a service provided by the service providing device and to allow the first device to control the service provided by the service providing device, and wherein the second device communicates with the service providing device through bi-directional communication and controls the service providing device by a processor included in the second device, wherein the second device receives a list of services provided by the service providing device, according to the second device being authenticated as a driver device, and transmits at least one service that is controlled by the first device from the list of services provided by the service providing device to the first device according to the first device being authenticated as a passenger device, and wherein the list of services provided by the service providing device includes at least one service that is controlled by the second device and at least one service whose control by the second device is blocked when the vehicle is driving.

16. The method of claim 15, wherein the identification information related to the service providing device comprises a list of services controllable by the first device.

17. The method of claim 16, wherein the list of services controllable by the first device comprises services controlled through an application that is being executed in the second device.

18. The method of claim 16, wherein the second device excludes the at least one service that is be controlled by the second device from the list of services controllable by the first device transmitted to the first device.

19. The method of claim 15, further comprising:
receiving a media access control (MAC) address from the first device; and
transmitting the received MAC address and information requesting connection from the first device to the service providing device.

20. The method of claim 15, wherein the identification information related to the service providing device comprises:
capability information of the service providing device;
an encryption key;
authentication information; and
connection information used to connect the service providing device through in-band communication.

21. The method of claim 15, further comprising performing an authentication process of authenticating the first device through the first out-of-band communication.

22. The method of claim 15, wherein the first out-of-band communication is performed by using one of near field communication and Bluetooth low energy communication.

23. The method of claim 15, wherein the identification information related to the service providing device comprises identification information of the at least one application or an execution command thereof.

24. A method for device control performed by a service providing device providing a service controllable by a second device, the service providing device being included in a vehicle, the method comprising:
connecting a first device through in-band communication;
obtaining identification information related to the first device from the first device;
determining a service controllable by the first device based on the obtained identification information, and
controlling the service provided by the service providing device according to the determined service and a control command received from the first device, wherein identification information related to the service providing device is provided from the second device to the first device for the connecting between the first device and the service providing device and, wherein the second device is connected to the service providing device through the in-band communication for receiving service information from the service providing device and is connected to the service providing device through out-of-band communication for authorization to control the service provided by the service providing device and to allow the first device to control the service provided by the service providing device, and wherein the second device communicates with the service providing device through bi-directional communication and controls the service providing device by a processor included in the second device, wherein the second device receives a list of services provided by the service providing device, according to the second device being authenticated as a driver device, and transmits at least one service that is controlled by the first device from the list of services provided by the service providing device to the first device according to the first device being authenticated as a passenger device, and wherein the list of services provided by the service providing device includes at least one service that is controlled by the second device and at least one service whose control by the second device is blocked when the vehicle is driving.

25. The method of claim 24,
wherein the identification information related to the first device comprises a result of authenticating the first device from the second device,
wherein the determining of the services controllable by the first device comprises determining a list of the services controllable by the first device when the first device is authenticated by the second device.

26. A method for device control performed by a service providing device providing a service controllable by a second device, the service providing device being included in a vehicle, the method comprising:
obtaining identification information related to a first device from the second device, wherein the second device is connected to the service providing device through in-band communication for receiving service information from the service providing device and is connected to the service providing device through a second out-of-band communication for authorization to control the service provided by the service providing device and to allow the first device to control a service provided by the service providing device;
connecting the first device through the in-band communication using the identification information;
determining services controllable by the first device based on the obtained identification information; and
controlling the service provided by the service providing device according to the determined services, and
wherein the second device communicates with the service providing device through bi-directional communication and controls the service providing device by a processor included in the second device, wherein the second device receives a list of services provided by the service providing device, according to the second device being authenticated as a driver device, and transmits at least one service that is controlled by the first device from the list of services provided by the service providing device to the first device according to the first device being authenticated as a passenger device, and wherein the list of services provided by the service providing device includes at least one service that is controlled by the second device and at least one service whose control by the second device is blocked when the vehicle is driving.

27. The method of claim 26, wherein the identification information related to the first device comprises a media access control address of the first device.

28. A first device comprising:
a first communicator configured to connect, through a first out-of-band communication, to a second device that includes identification information related to a service providing device, and receive the identification information related to the service providing device from the second device, the service providing device being included in a vehicle;
a second communicator configured to connect, through in-band communication, to the service providing device by using the received identification information; and
a controller configured to execute at least one application related to the received identification information and control a service provided by the service providing device,
wherein the second device is connected to the service providing device through the in-band communication for receiving service information from the service providing device and is connected to the service providing device through a second out-of-band communication for authorization to control the service provided by the service providing device and to allow the first device to control the service provided by the service providing device, and
wherein the second device communicates with the service providing device through bi-directional communication and controls the service providing device by a processor included in the second device,
wherein the second device receives a list of services provided by the service providing device, according to the second device being authenticated as a driver device, and transmits at least one service that is controlled by the first device from the list of services provided by the service providing device to the first device according to the first device being authenticated as a passenger device, and
wherein the list of services provided by the service providing device includes at least one service that is controlled by the second device and at least one service whose control by the second device is blocked when the vehicle is driving.

29. The first device of claim 28, further comprising:
a display configured to display a user interface including the at least one service that is controlled by the first device.

30. The first device of claim 29, wherein a list of services controllable by the first device comprises a service controlled through an application that is being executed in the second device.

31. The first device of claim 28,
wherein the first communicator is configured to transmit a media access control (MAC) address of the first device to the second device, and
wherein the second communicator is configured to receive a connection request from the service providing device that is configured to receive the MAC address of the first device from the second device and is configured to connect the service providing device through in-band communication according to the connection request.

32. The first device of claim 28, wherein the identification information related to the service providing device comprises:
capability information of the service providing device;
an encryption key;
authentication information; and
connection information configured to connect the service providing device through in-band communication.

33. The first device of claim 28, further comprising: an authentication request unit configured to perform an authentication process with the second device connected through the first communicator.

34. The first device of claim 33, wherein the second communicator is configured to be connected to the service providing device by using a result of the authentication process performed by the authentication request unit.

35. The first device of claim 28, wherein the second communicator is configured to receive a list of services controllable by the first device from the service providing device, and
wherein the controller is configured to control the service included in the received list of services controllable by the first device.

36. The first device of claim 28, wherein the controller is configured to control the service in response to the first device being determined to be within a predetermined distance from the second device.

37. The first device of claim 36, wherein the controller is configured to determine that the first device is within the predetermined distance from the second device when the first communicator is further configured to enable the first out-of-band communication with the second device.

38. The first device of claim 28, wherein the first out-of-band communication is one of near field communication and Bluetooth low energy communication.

39. The first device of claim 28, wherein the identification information related to the service providing device comprises identification information of the at least one application or an execution command thereof.

40. The first device of claim 28, further comprising:
a display,
wherein the controller is configured to control the display to provide a user interface including the at least one service that is controlled by the first device.

41. A second device comprising:
an out-of-band communicator for transmitting identification information related to a service providing device to a first device through a first out-of-band communication, the service providing device being included in a vehicle; and
a controller for executing at least one application related to the service providing device,
wherein the identification information is related to the at least one application and the second device is connected to the service providing device through in-band communication for receiving service information from the service providing device and is connected to the service providing device through a second out-of-band communication for authorization to control a service provided by the service providing device and to allow the first device to control the service provided by the service providing device, and wherein the second device communicates with the service providing device through bi-directional communication and controls the service providing device by a processor included in the second device, wherein the second device receives a list of services provided by the service providing device, according to the second device being authenticated as a driver device, and transmits at least one service that is controlled by the first device from the list of services provided by the service providing device to the first device according to the first device being authenticated as a passenger device, and wherein the list of services provided by the service providing device includes at least one service that is controlled by the second device and at least one service whose control by the second device is blocked when the vehicle is driving.

42. The second device of claim 41, wherein the identification information related to the service providing device comprises a list of services controllable by the first device.

43. The second device of claim 42, wherein the list of services controllable by the first device comprises a service controlled through an application that is being executed in the second device.

44. The second device of claim 42, wherein the controller is configured to exclude the service controllable by the second device from the list of services controllable by the first device transmitted to the first device.

45. The second device of claim 41, wherein the out-of-band communicator is configured to receive a media access control (MAC) address from the first device, and transmit the received MAC address and information requesting a connection from the first device to the service providing device.

46. The second device of claim 41, wherein the identification information related to the service providing device comprises:
capability information of the service providing device;
an encryption key;
authentication information; and
connection information used to connect the service providing device through in-band communication.

47. The second device of claim 41, further comprising: an authentication processing unit configured to perform an authentication process that authenticates the first device through the first out-of-band communication.

48. The second device of claim 41, wherein the first out-of-band communication is performed by using one of near field communication and Bluetooth low energy communication.

49. The second device of claim 41, wherein the identification information related to the service providing device comprises identification information of the at least one application or an execution command thereof.

* * * * *